US011122516B2

(12) United States Patent
Zhang et al.

(10) Patent No.: US 11,122,516 B2
(45) Date of Patent: Sep. 14, 2021

(54) SYSTEMS AND METHODS FOR UPLINK TRANSMISSION POWER CONTROL

(71) Applicant: Apple Inc., Cupertino, CA (US)

(72) Inventors: Yushu Zhang, Beijing (CN); RongZhen Yang, Shanghai (CN); Yuan Zhu, Beijing (CN); Gang Xiong, Portland, OR (US); Wenting Chang, Beijing (CN); Guotong Wang, Beijing (CN); Dae Won Lee, Portland, OR (US); Yongjun Kwak, Portland, OR (US)

(73) Assignee: APPLE INC., Cupertino, CA (US)

( * ) Notice: Subject to any disclaimer, the term of this patent is extended or adjusted under 35 U.S.C. 154(b) by 30 days.

(21) Appl. No.: 16/407,952

(22) Filed: May 9, 2019

(65) Prior Publication Data
US 2019/0357151 A1 Nov. 21, 2019

Related U.S. Application Data

(63) Continuation of application No. 16/323,475, filed as application No. PCT/US2017/045780 on Aug. 7, 2017.

(Continued)

(30) Foreign Application Priority Data

Aug. 5, 2016 (WO) ................ PCT/CN2016/093718

(51) Int. Cl.
*H04W 52/14* (2009.01)
*H04W 52/24* (2009.01)
(Continued)

(52) U.S. Cl.
CPC ........ *H04W 52/146* (2013.01); *H04B 7/0404* (2013.01); *H04B 7/0617* (2013.01);
(Continued)

(58) Field of Classification Search
CPC ............. H04W 52/146; H04W 72/042; H04W 52/325; H04W 72/0413; H04W 72/0473; H04W 52/243; H04W 52/04; H04W 52/40; H04W 52/16; H04W 52/242; H04W 52/367; H04W 52/34; H04W 52/54; H04W 52/58; H04W 72/12; H04W 88/02; H04W 52/248; H04W 52/346; H04W 52/50; H04W 72/04; H04L 5/0053; H04L 5/001; H04L 5/0048; H04L 5/14; H04L 5/0023; H04L 5/0092; H04L 5/0094;
(Continued)

(56) References Cited

U.S. PATENT DOCUMENTS

| 2013/0102345 A1* | 4/2013 | Jung .................... H04B 7/0456 455/513 |
| 2014/0016573 A1 | 1/2014 | Nuggehalli et al. |

(Continued)

OTHER PUBLICATIONS

3GPP TSG-RAN WG1 #51 (R1-074850); Uplink Power Control for E-UTRA—Range and Representation of P0; Agenda Item: 6.4.2; Source: Ericsson; Jeju, Korea; Nov. 5-9, 2007.

*Primary Examiner* — Golam Sorowar

(57) ABSTRACT

Uplink Transmission Power Control (TPC) techniques configured to compensate for variations in path loss and/or interference on a plurality of uplink transmission beams.

11 Claims, 18 Drawing Sheets

Related U.S. Application Data

(60) Provisional application No. 62/501,623, filed on May 4, 2017.

(51) Int. Cl.
*H04W 52/32* (2009.01)
*H04B 7/06* (2006.01)
*H04B 7/0404* (2017.01)

(52) U.S. Cl.
CPC ....... *H04W 52/241* (2013.01); *H04W 52/242* (2013.01); *H04W 52/243* (2013.01); *H04W 52/325* (2013.01); *H04B 7/0626* (2013.01); *H04W 52/245* (2013.01)

(58) Field of Classification Search
CPC ... H04L 5/0037; H04L 5/0055; H04L 5/1469; H04L 27/2613; H04L 5/0007; H04L 1/00; H04L 5/005; H04L 5/0051; H04L 5/0091; H04L 1/1812; H04L 27/2601; H04L 5/0035; H04L 5/0044
See application file for complete search history.

(56) References Cited

U.S. PATENT DOCUMENTS

| | | | |
|---|---|---|---|
| 2014/0315594 A1* | 10/2014 | Jeong | H04W 52/146 455/522 |
| 2014/0367069 A1 | 12/2014 | Yamaguchi et al. | |
| 2015/0043448 A1* | 2/2015 | Chatterjee | H04W 4/70 370/329 |
| 2015/0312817 A1* | 10/2015 | Huang | H04W 36/0094 370/332 |
| 2016/0007373 A1* | 1/2016 | Davydov | H04L 5/0044 370/329 |
| 2017/0303206 A1 | 10/2017 | Cheng et al. | |
| 2017/0367069 A1* | 12/2017 | Agiwal | H04B 7/0695 |

\* cited by examiner

SYSTEMS AND METHODS FOR UPLINK TRANSMISSION POWER CONTROL

RELATED APPLICATIONS

The present application is a continuation of U.S. patent application Ser. No. 16/323,475 filed Feb. 5, 2019 which is a 371 Nationalization of PCT Application No. PCT/US2017/045780 filed Aug. 7, 2017, which claims the benefit of U.S. Provisional Application No. 62/501,623 and CN PCT Application No. PCT/CN2016/093718 filed Aug. 5, 2016, the entire specifications of which are hereby incorporated by reference in their entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network. The UE can be one or more of a smart phone, a tablet computing device, a laptop computer, an internet of things (IOT) device, and/or another type of computing devices that is configured to provide digital communications. As used herein, digital communications can include data and/or voice communications, as well as control information.

The power level that the BSs and UEs transmit at has an impact on interference in the system. The management of uplink transmission power by the UE can reduce interference with other UEs and increase the battery life of the given UE. The uplink Transmit Power Control (TPC) can adapt to radio propagation channel conditions, including path loss, shadowing and fast fade fluctuations, while reducing the interference effects from other user equipment, within the cell and from neighboring cells.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
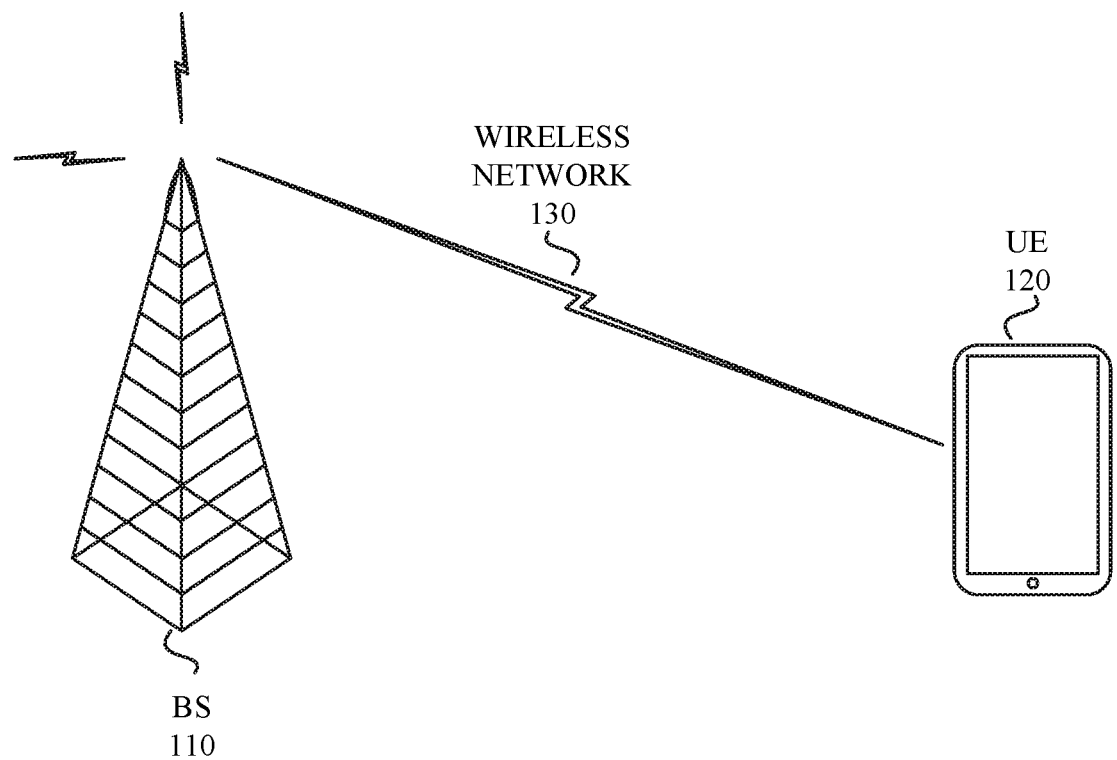
FIG. 1 illustrates a wireless system, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be refer to as a "mobile device," "wireless device," of "wireless mobile device."

As used herein, the term "wireless access point" or "Wireless Local Area Network Access Point (WLAN-AP)" refers to a device or configured node on a network that allows wireless capable devices and wired networks to connect through a wireless standard, including WiFi, Bluetooth, or other wireless communication protocol.

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP), and will be referred to herein simply as "New Radio (NR)."

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, a Transmit Power Control (TPC) scheme for a User Equipment (UE) can include receiving power control factors for corresponding uplink transmission beams. The power control factors can include a resource block power ($P_O$) for each uplink transmission beam, and a path loss compensation factor ($\alpha$). The UE can estimate the path loss (PL) for the corresponding uplink transmission beams. A transmission power of one or more of the plurality of uplink transmission beams can be determined by the UE as a function of the power control factors, and estimated path loss of the corresponding ones of the plurality of uplink transmission beams.

In another aspect, a Transmit Power Control (TPC) scheme for a User Equipment (UE) can include receiving power control factors common for a plurality of uplink transmission beams. The power control factors can include a resource block power ($P_O$) common to the plurality of uplink transmission beam, and a path loss compensation factor ($\alpha$). An offset power control factor can also be received for corresponding uplink transmission beams. The UE can estimate the path loss (PL) for the corresponding uplink transmission beams. A transmission power of one or more of the plurality of uplink transmission beams can be determined by the UE as a function of the decoded common power control factor, the offset power control factors for corresponding ones of a plurality of uplink transmission beams, and the estimated path loss of the corresponding ones of the plurality of uplink transmission beams.

In yet another aspect, a Transmit Power Control (TPC) scheme can include a Base Station (BS) transmitting a configuration for a first power control process (PC0) to a User Equipment (UE). The BS can also transmit an UL grant for the first power control process (PC0) to the UE. The UE can transmit on the extended Physical Uplink Shared Channel (xPUSCH)/Sounding Reference Signal (xSRS) based on the configured power control factors in the first power control process (PC0). The BS can transmit a downlink assignment including a second power control process (PC1). The UE can transmit to the BS a feedback acknowledgement/negative acknowledgement (ACK/NACK) in an extended Physical Uplink Control Channel (xPUCCH) with the power control factors in the first power control process (PC0).

In yet another aspect, a Beam Management (BM) Transmit Power Control (TPC) scheme for a User Equipment (UE) can include receiving one or more power control factors of a plurality of Beam Management Signals (BMS). The UE can estimate the path loss (PL) for corresponding ones of the plurality of Beam Management Signals (BMS). The UE can determine the $k^{th}$ least path loss ($PL_{k^{th}}$) (e.g., $k^{th}$ best DL beam) for the plurality of Uplink Beam Management Signals (UL BMS). The transmission power of corresponding ones of the plurality of Uplink Beam Management Signals (UL BMS) can be determined by the UE as a function of the one or more decoded power control factors and the determined $k^{th}$ least path loss ($PL_{k^{th}}$) of the Downlink Beam Measurement Reference Signal (DL BM RS).

In yet another aspect, a Beam Management (BM) Transmit Power Control (TPC) scheme for a User Equipment (UE) can include receiving one or more power control factors of a plurality of Beam Management Signals (BMS). The UE can estimate the path loss (PL) for a set of the plurality of Beam Management Signals (BMS). The UE can determine a mean, median, mode or filtered path loss ($\overline{PL}$) for the set of the plurality of Uplink Beam Management Signals (UL BMS). The transmission power of corresponding ones of the plurality of Uplink Beam Management Signals (UL BMS) can be determined by the UE as a function of power control factors and the determined mean, median, mode or filtered path loss ($\overline{PL}$) of the Downlink Beam Measurement Reference Signal (DL BM RS).

FIG. 1 illustrates a wireless system, in accordance with an example. In one aspect, the wireless system 100 includes one or more Base Stations (BS) 110 and one or more User Equipment (UE) devices 120 that can be communicatively coupled by a wireless communication protocol. In one instance, the one or more BSs may be Long Term Evolved (LTE) evolved NodeBs (eNB) that can be communicatively coupled to one or more UEs by a Third-Generation Partnership Project (3GPP) Long Term Evolved (LTE) network. In one instance, the UE can be one or more of a smart phone, a tablet computing device, a laptop computer, an internet of things (IOT) device, and/or another type of computing devices that is configured to provide digital communications. As used herein, digital communications can include data and/or voice communications, as well as control information.

Figure 2:
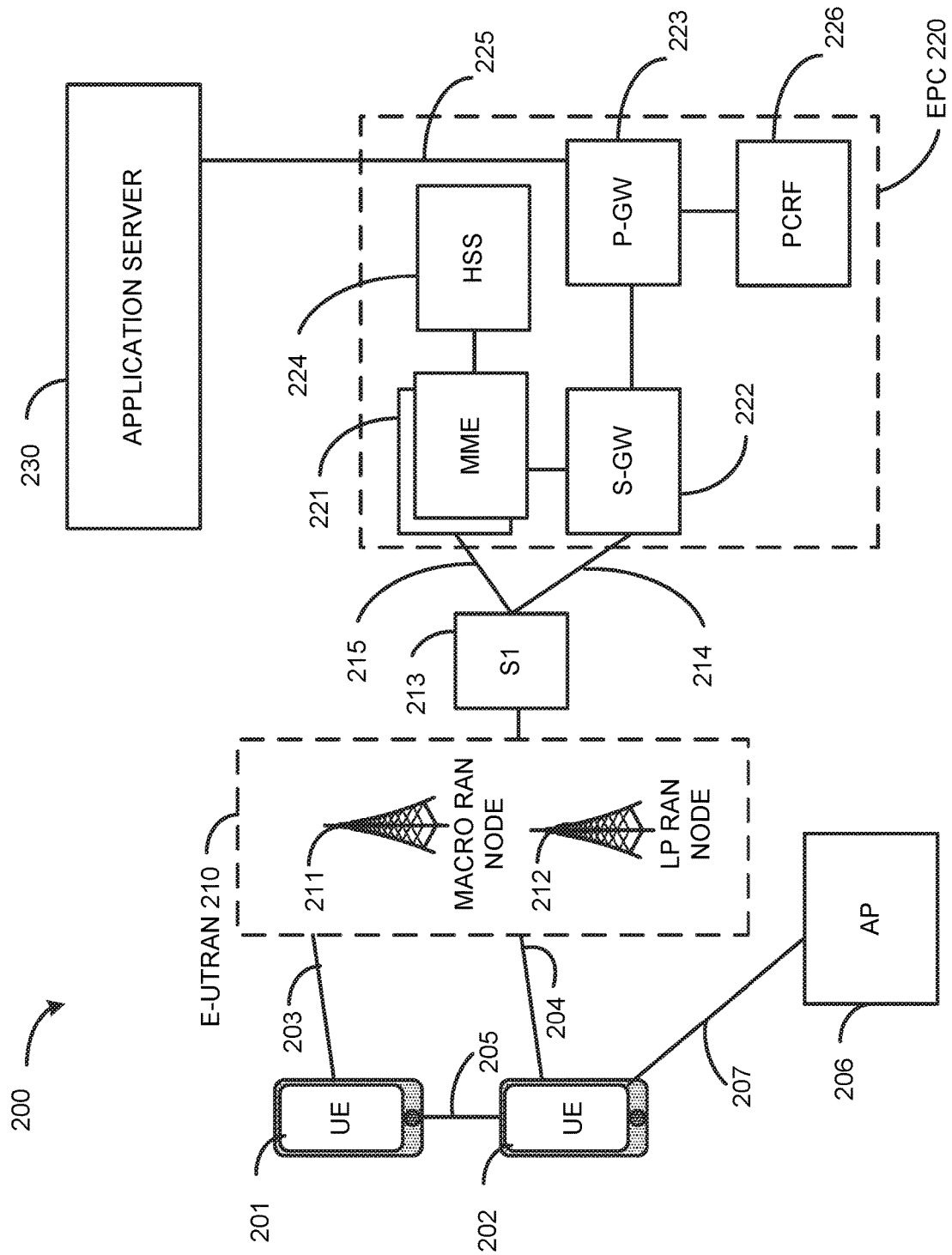
FIG. 2 illustrates an architecture of a wireless network with various components of the network in accordance with some embodiments.

FIG. 2 illustrates an architecture of a wireless network with various components of the network in accordance with some embodiments. A system 200 is shown to include a user equipment (UE) 201 and a UE 202. The UEs 201 and 202 are illustrated as smartphones (i.e., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface. In some embodiments, any of the UEs 201 and 202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for (machine initiated) exchanging data with an MTC server and/or device via a public land mobile network (PLMN), Proximity-Based Service (ProSe) or device-to-device (D2D) communication, sensor networks, or IoT networks. An IoT network describes interconnecting uniquely identifiable embedded computing devices (within the internet infrastructure) having short-lived connections, in addition to background applications (e.g., keep-alive messages, status updates, etc.) executed by the IoT UE.

The UEs 201 and 202 are configured to access a radio access network (RAN)—in this embodiment, an Evolved Universal Mobile Telecommunications System (UMTS) Terrestrial Radio Access Network (E-UTRAN) 210. The UEs 201 and 202 utilize connections 203 and 204, respectively, each of which comprises a physical communications interface or layer (discussed in further detail below); in this example, the connections 203 and 204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, and the like.

In this embodiment, the UEs 201 and 202 may further directly exchange communication data via a ProSe interface 205. The ProSe interface 205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PBSCH).

The UE 202 is shown to be configured to access an access point (AP) 206 via connection 207. The connection 207 can comprise a local wireless connection, such as a connection consistent with any IEEE 802.11 protocol, wherein the AP 206 would comprise a wireless fidelity (WiFi) router. In this example, the AP 206 is shown to be connected to the Internet without connecting to the core network of the wireless system (described in further detail below).

The E-UTRAN 210 can include one or more access points that enable the connections 203 and 204. These access points can be referred to as access nodes, base stations (BSs), NodeBs, eNodeBs, gNodeBs, RAN nodes, RAN nodes, and so forth, and can comprise ground stations (i.e., terrestrial access points) or satellite access points providing coverage within a geographic area (i.e., a cell). The E-UTRAN 210 may include one or more RAN nodes 211 for providing macrocells and one or more RAN nodes 212 for providing femtocells or picocells (i.e., cells having smaller coverage areas, smaller user capacity, and/or higher bandwidth compared to macrocells).

Any of the RAN nodes 211 and 212 can terminate the air interface protocol and can be the first point of contact for the UEs 201 and 202. In some embodiments, any of the RAN nodes 211 and 212 can fulfill various logical functions for the E-UTRAN 210 including, but not limited to, radio network controller (RNC) functions such as radio bearer management, uplink and downlink dynamic radio resource management and data packet scheduling, and mobility management.

In accordance with some embodiments, the UEs 201 and 202 can be configured to communicate using Orthogonal Frequency-Division Multiplexing (OFDM) communication signals with each other or with any of the RAN nodes 211 and 212 over a multicarrier communication channel in accordance various communication techniques, such as an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 and 212 to the UEs 201 and 202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UEs 201 and 202. The physical downlink control channel (PDCCH) carries information about the transport format and resource allocations related to the PDSCH channel, among other things. It also informs the UEs 201 and 202 about the transport format, resource allocation, and H-ARQ (Hybrid Automatic Repeat Request) information related to the uplink shared channel. Typically, downlink scheduling (assigning control and shared channel resource blocks to the UE 102 within a cell) is performed at any of the RAN nodes 211 and 212 based on channel quality information fed back from any of the UEs 201 and 202, and then the downlink resource assignment information is sent on the PDCCH used for (i.e., assigned to) each of the UEs 201 and 202.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the Downlink Control Information (DCI) and the channel condition. There can be four or more different PDCCH formats defined in LTE with different numbers of CCEs (e.g., aggregation level, L=1, 2, 4, or 8).

The E-UTRAN 210 is shown to be communicatively coupled to a core network—in this embodiment, an Evolved Packet Core (EPC) network 220 via an S1 interface 213. In this embodiment the S1 interface 213 is split into two parts: the S1-U interface 214, which carries traffic data between the RAN nodes 211 and 212 and the serving gateway (S-GW) 222, and the S1-MME interface 215, which is a signaling interface between the RAN nodes 211 and 212 and the mobility management entities (MMEs) 221.

In this embodiment, the EPC network 220 comprises the MMEs 221, the S-GW 222, the Packet Data Network (PDN) Gateway (P-GW) 223, and a home subscriber server (HSS) 224. The MMEs 221 are similar in function to the control plane of legacy Serving General Packet Radio Service (GPRS) Support Nodes (SGSN). The MMEs 221 manage mobility aspects in access such as gateway selection and tracking area list management. The HSS 224 comprises a database for network users, including subscription-related information to support the network entities' handling of communication sessions. The EPC network 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 terminates the S1 interface 213 towards the E-UTRAN 210, and routes data packets between the E-UTRAN 210 and the EPC network 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 terminates an SGi interface toward a PDN. The P-GW 223 routes data packets between the EPC network 223 and external networks such as a network including the application server 230 (alternatively referred to as application function (AF)) via an Internet Protocol (IP) interface 225. Generally, the application server 230 is an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP communications interface 225. The application server 230 can also be configured to support one or more communication services (e.g., Voice-over-Internet Protocol (VoIP) sessions, PTT sessions, group communication sessions, social networking services, etc.) for the UEs 201 and 202 via the EPC network 220.

The P-GW 223 may further be a node for policy enforcement and charging data collection. Policy and Charging Enforcement Function (PCRF) 226 is the policy and charging control element of the EPC network 220. In a non-roaming scenario, there may be a single PCRF in the Home Public Land Mobile Network (HPLMN) associated with a User Equipment's (UE) Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and selecting the appropriate Quality of Service (QoS) and charging parameters. The PCRF 226 may provision this rule into a Policy and Charging Enforcement Function (PCEF) (not shown) with the appropriate traffic flow template (TFT) and QoS class of identifier (QCI), which commences the QoS and charging as specified by the application server.

Figure 3:
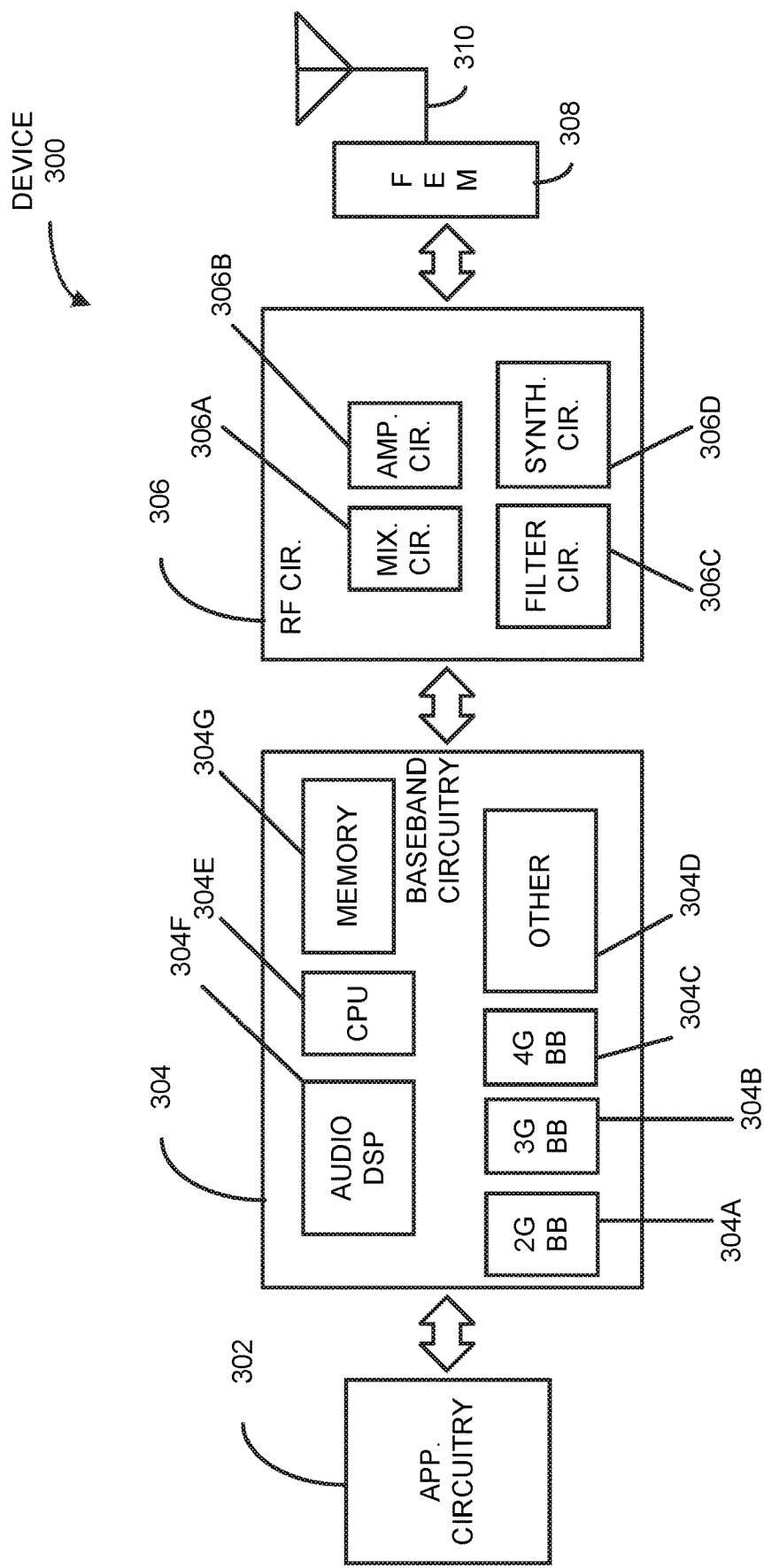
FIG. 3 illustrates example components of a device in accordance with some embodiments.

FIG. 3 illustrates example components of a device in accordance with some embodiments. In some embodiments, the device 300 may include application circuitry 302, baseband circuitry 304, Radio Frequency (RF) circuitry 306, front-end module (FEM) circuitry 308, and one or more antennas 310, coupled together at least as shown. The components of the illustrated device 300 may be included a UE or a RAN node. In some embodiments, the device 300 may include less elements (e.g., a RAN node may not utilize application circuitry 302, and instead include a processor/controller to process IP data received from an EPC). In some embodiments, the device 300 may include additional elements such as, for example, memory/storage, display, camera, sensor, and/or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a second generation (2G) baseband processor 304*a*, third generation (3G) baseband processor 304*b*, fourth generation (4G) baseband processor 304*c*, and/or other baseband processor(s) 304*d* for other existing generations, generations in development or to be developed in the future (e.g., fifth generation (5G), 6G, etc.). The baseband circuitry 304 (e.g., one or more of baseband processors 304*a*-*d*) may handle various radio control functions that enable communication with one or more radio networks via the RF circuitry 306. In other embodiments, some or all of the functionality of baseband processors 304*a*-*d* may be included in modules stored in the memory 304*g* and executed via a Central Processing Unit (CPU) 304*e*. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, and/or constellation mapping/demapping functionality. In some embodiments, encoding/decoding circuitry of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry may include one or more audio digital signal processor(s) (DSP) 304*f*. The audio DSP(s) 304*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a necessity. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a necessity. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310.

In some embodiments, the FEM circuitry 308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310.

In some embodiments, the device 300 comprises a plurality of power saving mechanisms. If the device 300 is in an RRC_Connected state, where it is still connected to the RAN node as it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the device 300 may transition off to an RRC_Idle state, where it disconnects from the network and does not perform operations such as channel quality feedback, handover, etc. The device 300 goes into a very low power state and it performs paging where again it periodically wakes up to listen to the network and then powers down again. The device cannot receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack. For example, processors of the baseband circuitry 304, alone or in combination, may be used execute Layer 3, Layer 2, and/or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 4:
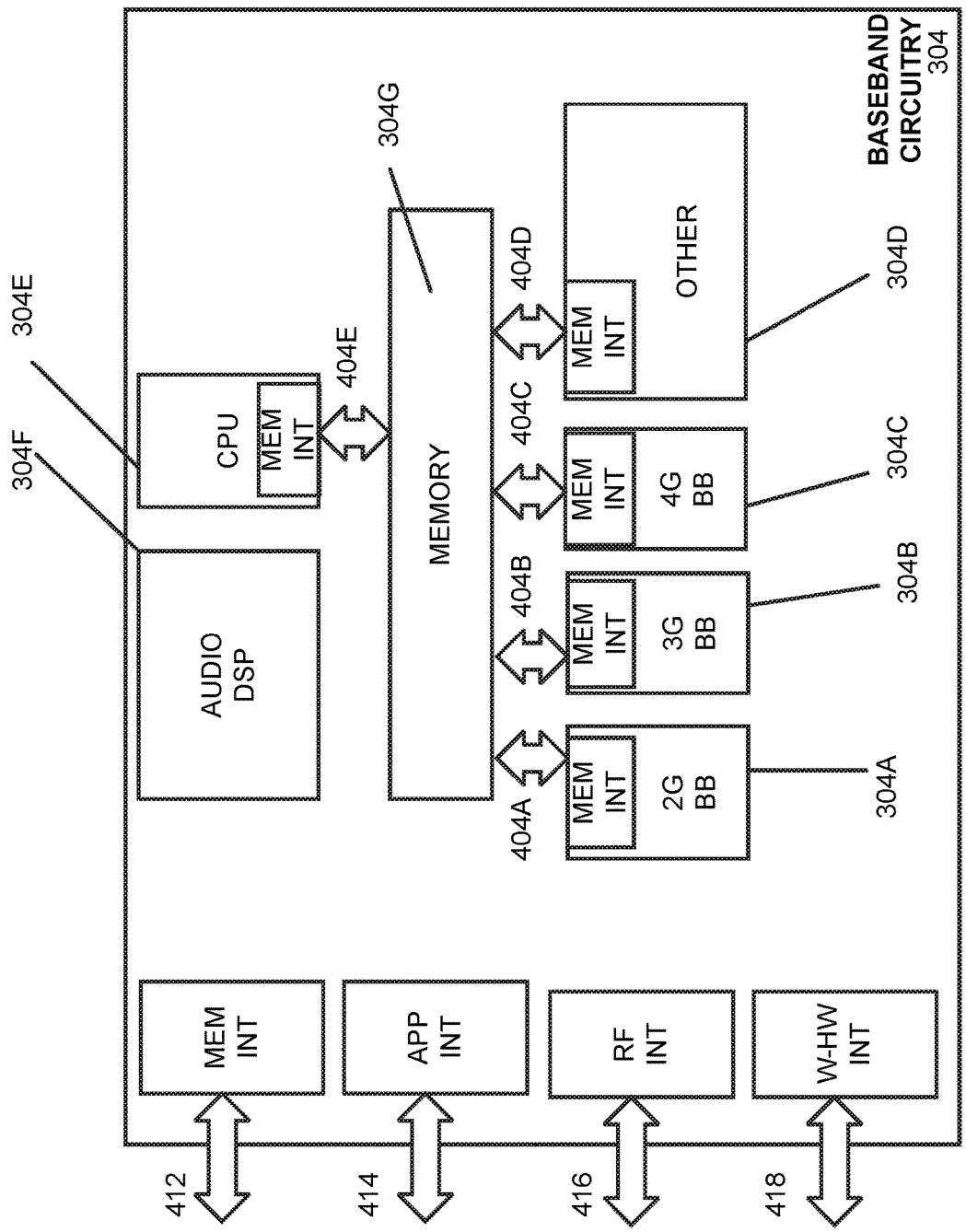
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), and a wireless hardware connectivity interface 418 (e.g., an interface to send/receive data to/from Near Field Communication (NFC) components, Bluetooth® components (e.g., Bluetooth® Low Energy), Wi-Fi® components, and other communication components).

Figure 5:
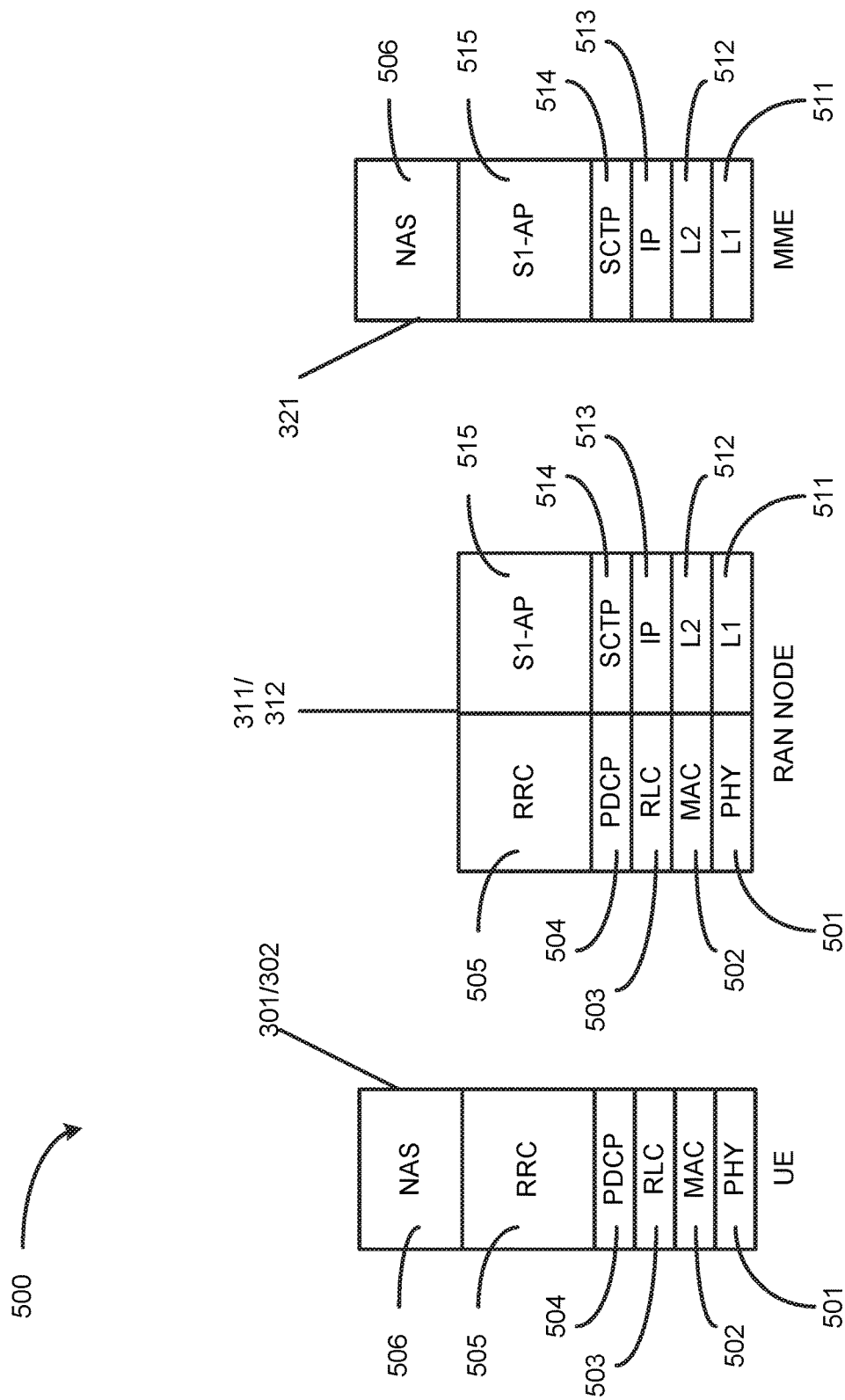
FIG. 5 is an illustration of a control plane protocol stack in accordance with some embodiments.

FIG. 5 is an illustration of a control plane protocol stack in accordance with some embodiments. In this embodiment, a control plane 500 is shown as a communications protocol stack between the UE 201 (or alternatively, the UE 202), the RAN node 211 (or alternatively, the RAN node 212) and the MME 221.

The PHY layer 501 transmits and/or receives information used by the MAC layer 502 over one or more air interfaces. The PHY layer 501 may further perform link adaptation or adaptive modulation and coding (AMC), power control, cell search (e.g., for initial synchronization and handover purposes) and other measurements used by higher layers, such as the RRC layer 505, error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 502 performs mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 503 may operate in a plurality of modes of operation, including: Transparent Mode (TM), Unacknowledged Mode (UM), and Acknowledged Mode (AM). The RLC layer 503 may execute transfer of upper layer protocol data units (PDUs), error correction through automatic repeat request (ARQ) for AM data transfers, and concatenation, segmentation and reassembly of RLC SDUs for UM and AM data transfers. The RLC layer 503 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 504 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, ciphering and deciphering of control plane data, integrity protection and integrity verification of control plane data, timer based discard of data, and security (e.g., ciphering, deciphering, integrity protection, integrity verification, etc.).

The main services and functions of the RRC layer 505 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 201 and the RAN node 211 may utilize a Uu interface (e.g., an LTE-Uu interface) to exchange control plane data via a protocol stack comprising the PHY layer 501, the MAC layer 502, the RLC layer 503, the PDCP layer 504, and the RRC layer 505.

The non-access stratum (NAS) protocols 506 form the highest stratum of the control plane between the UE 201 and the MME 221. The NAS protocols 506 support the mobility of the UE 201 and the session management procedures to establish and maintain IP connectivity between the UE 201 and the P-GW 223.

The S1 Application Protocol (S1-AP) layer 515 supports the functions of the S1 interface and comprises Elementary Procedures (EPs). An EP is a unit of interaction between the RAN node 211 and the EPC 220. The S1-AP layer services comprise two groups: UE-associated services and non UE-associated services. These services perform functions including, but are not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 514 ensures reliable delivery of signaling messages between the RAN node 211 and the MME 221 based, in part, on the IP protocol, supported by the IP layer 513. The L2 layer 512 and the L1 layer 511 refers to communication links (e.g., wired or wireless) used by the RAN node and the MME to exchange information.

The RAN node 211 and the MME 221 may utilize an S1-MME interface to exchange control plane data via a protocol stack comprising the L1 layer 511, the L2 layer 512, the IP layer 513, the SCTP layer 514, and the S1-AP layer 515.

Figure 6:
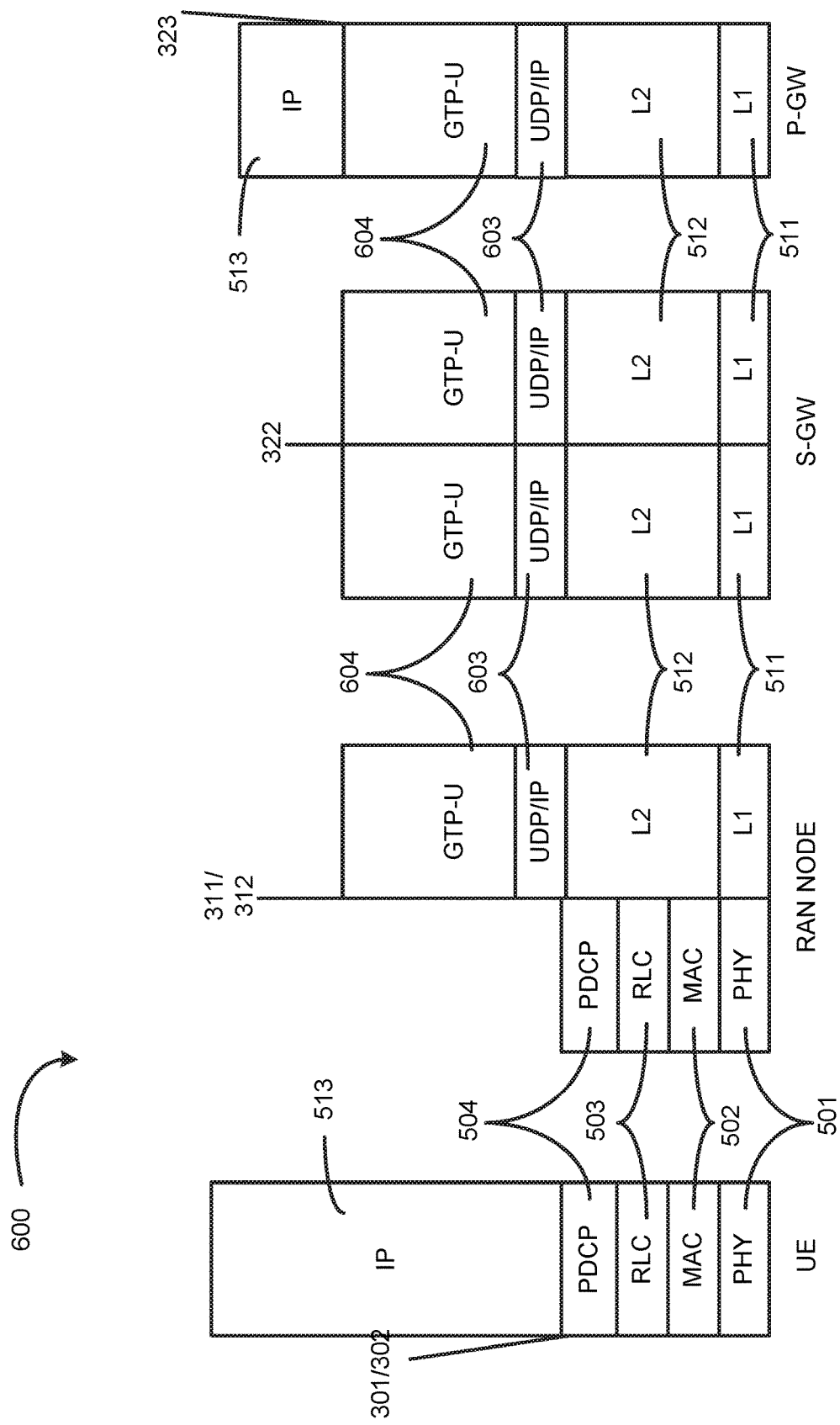
FIG. 6 is an illustration of a user plane protocol stack in accordance with some embodiments.

FIG. 6 is an illustration of a user plane protocol stack in accordance with some embodiments. In this embodiment, a user plane 600 is shown as a communications protocol stack between the UE 201 (or alternatively, the UE 202), the RAN node 211 (or alternatively, the RAN node 212), the S-GW 222, and the P-GW 223. The user plane 600 may utilize at least some of the same protocol layers as the control plane 500. For example, the UE 201 and the RAN node 211 may utilize a Uu interface (e.g., an LTE-Uu interface) to exchange user plane data via a protocol stack comprising the PHY layer 501, the MAC layer 502, the RLC layer 503, the PDCP layer 504.

The General Packet Radio Service (GPRS) Tunneling Protocol for the user plane (GTP-U) layer 604 may be used for carrying user data within the GPRS core network and between the radio access network and the core network. The user data transported can be packets in any of IPv4, IPv6, or PPP formats. The UDP and IP security (UDP/IP) layer 603 may provide checksums for data integrity, port numbers for addressing different functions at the source and destination, and encryption and authentication on the selected data flows. The RAN node 211 and the S-GW 222 may utilize an S1-U interface to exchange user plane data via a protocol stack comprising the L1 layer 511, the L2 layer 512, the UDP/IP layer 603, and the GTP-U layer 604. The S-GW 222 and the P-GW 223 may utilize an S5/S8a interface to exchange user plane data via a protocol stack comprising the L1 layer 511, the L2 layer 512, the UDP/IP layer 603, and the GTP-U layer 604. As discussed above with respect to FIG. 5, NAS protocols support the mobility of the UE 201 and the session management procedures to establish and maintain IP connectivity between the UE 201 and the P-GW 223.

Figure 7:
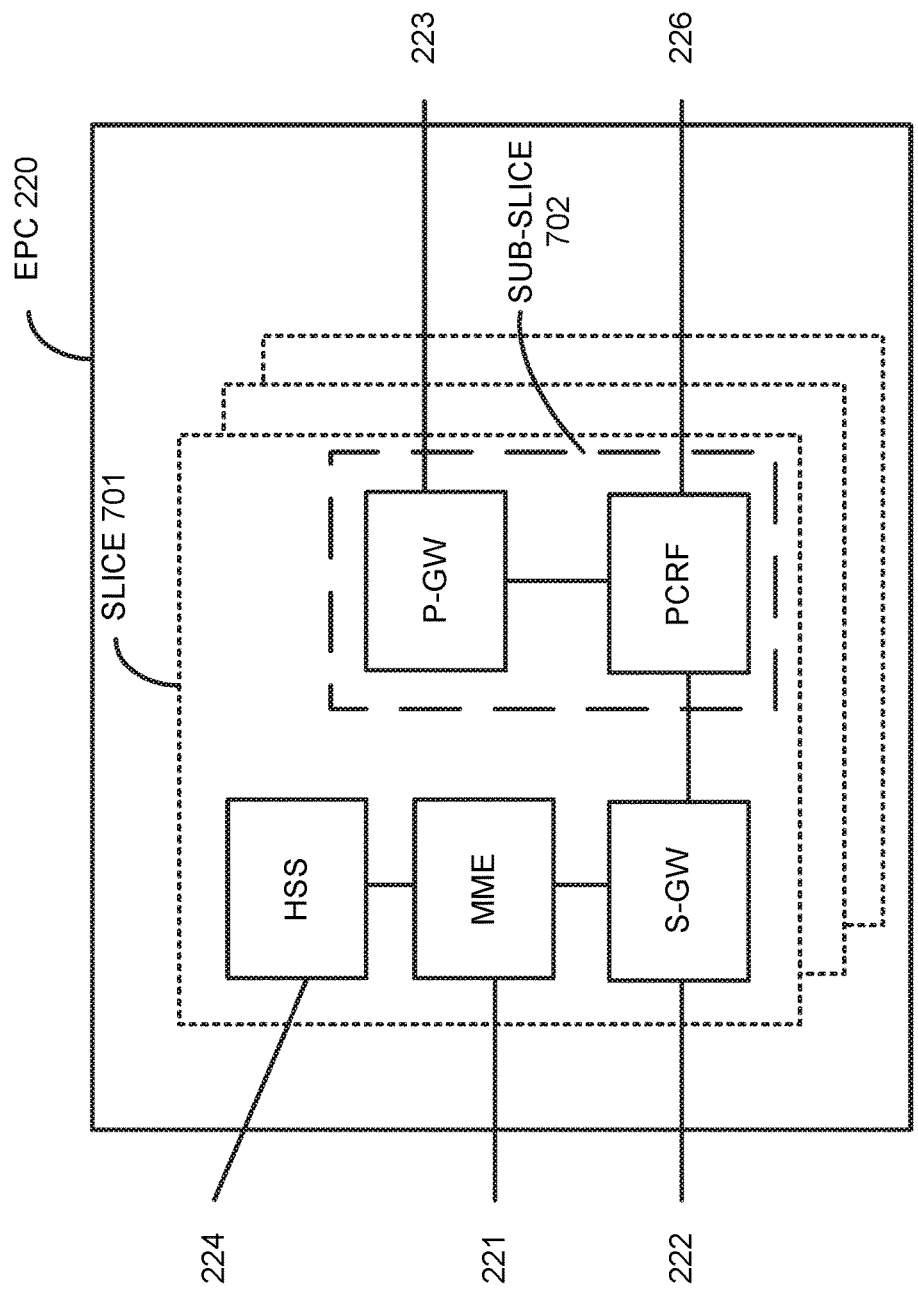
FIG. 7 illustrates components of a core network in accordance with some embodiments.

FIG. 7 illustrates components of a core network in accordance with some embodiments. The components of the EPC 220 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the EPC network 220 may be referred to as a network slice 701. A logical instantiation of a portion of the EPC network 220 may be referred to as a network sub-slice Y02 (e.g., the network sub-slice Y02 is shown to include the PGW 223 and the PCRF 226).

Figure 8:
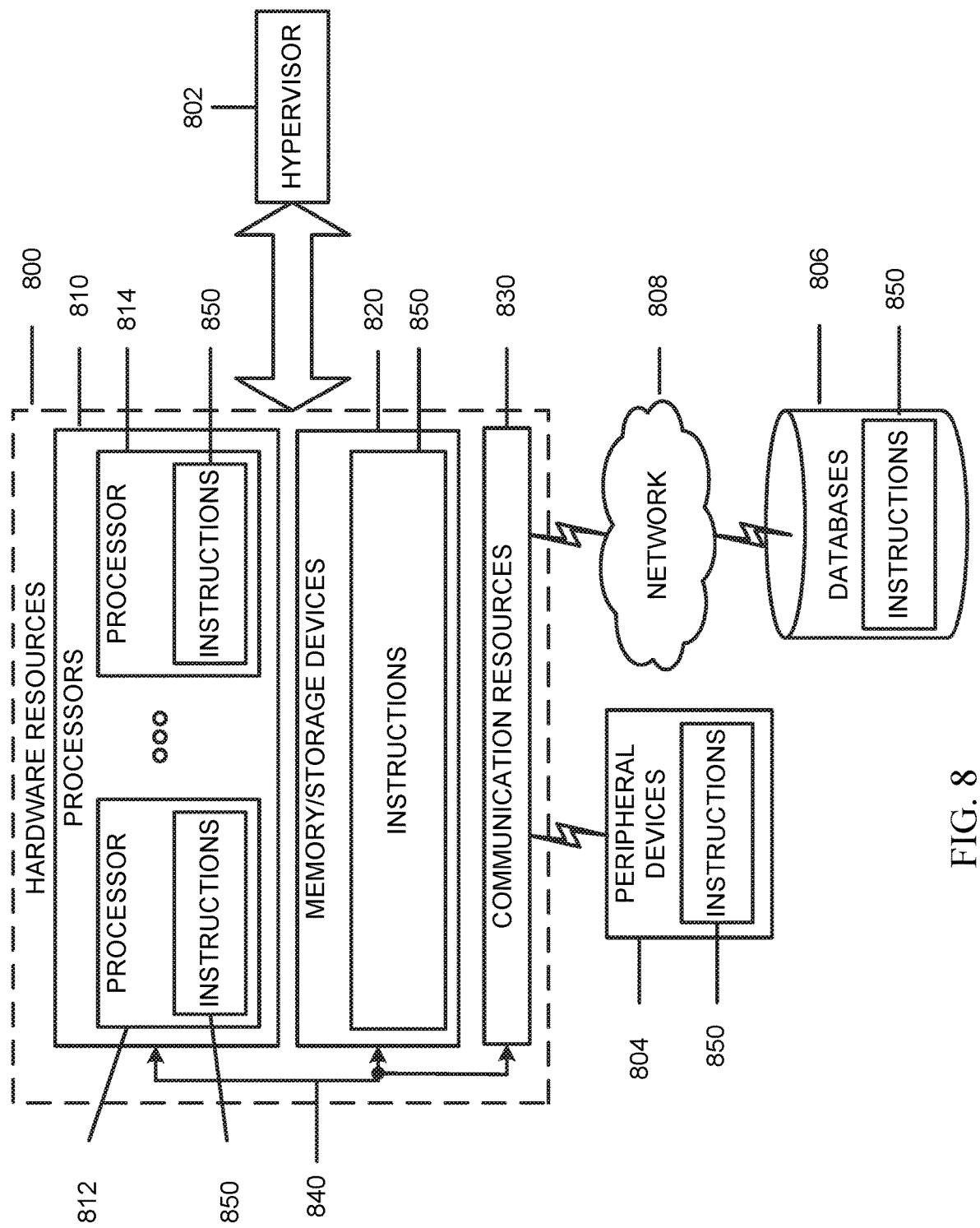
FIG. 8 is a block diagram illustrating components, according to some example embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which are communicatively coupled via a bus 840. For embodiments where node virtualization (e.g., NFV) is utilized, a hypervisor 802 may be executed to provide an execution environment for one or more network slices/sub-slices to utilize the hardware resources 800

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814. The memory/storage devices 820 may include main memory, disk storage, or any suitable combination thereof.

The communication resources 830 may include interconnection and/or network interface components or other suitable devices to communicate with one or more peripheral devices 804 and/or one or more databases 806 via a network 808. For example, the communication resources 830 may include wired communication components (e.g., for coupling via a Universal Serial Bus (UBS)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 and/or the databases 806. Accordingly, the memory of processors 810, the memory/storage devices 820, the peripheral devices 804, and the databases 806 are examples of computer-readable and machine-readable media.

Figure 9A:
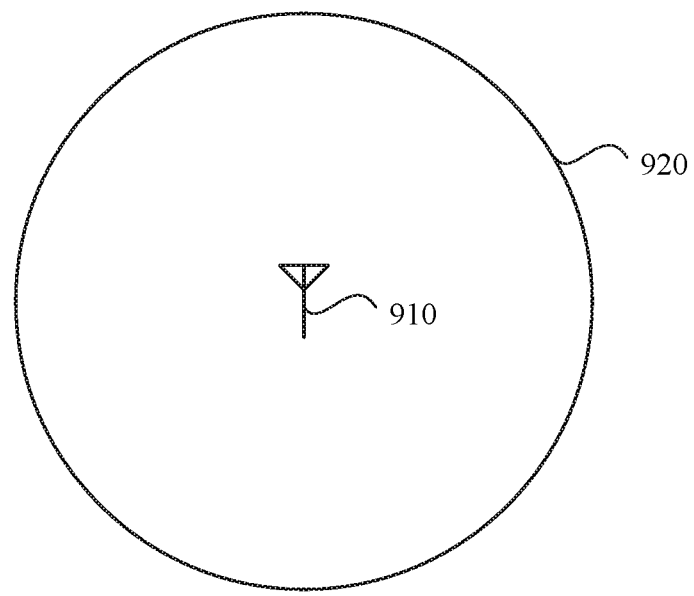
FIGS. 9A and 9B illustrate different transmission beam techniques for use in a wireless system, in accordance with an example.
Figure 9B:
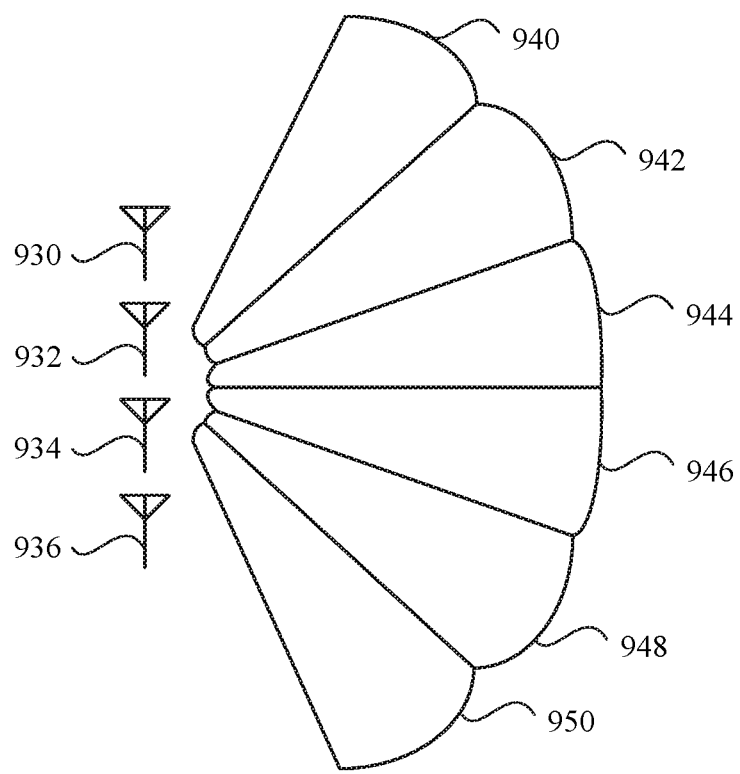

FIGS. 9A and 9B illustrate different transmission beam techniques for use in a wireless system, in accordance with an example. As illustrated in FIG. 9A, the Base Station (BS) or User Equipment (UE) can include an antenna 910 that transmits an omnidirectional beam 920. In one aspect, the BS and UE broadcast omnidirectional signals on predetermined frequency channels. In order to allow UEs to identify and communicate with separate BSs, the BS for each cell can broadcast an omni-directional control signal to each UE in the respective cell. The control channel can contain various types of information for signal synchronization, control and the like. As illustrated in FIG. 9B, the BS or UE can include a plurality of antennas 930-936 that transmit a plurality of directional beams 940-950. In one aspect, the BS and UE each use a plurality of antennas to directionally transmit signals. For each beam, a control channel signal can be transmitted by the BS for a short time interval on a corresponding beam. The control channel signal is periodically transmitted on corresponding ones of the plurality of beams, such that the control channel signal sweeps through the plurality of directional beams sequentially or in any other beam sequence pattern. After a number of sweep cycles, each UE in a cell can estimate from the pattern of received pulses one or more downlink beams exhibiting the strongest signals received at the UE. The UE can transmit the downlink beam information back to the BS, which can use it to transmit to the UE using the one or more downlink beams exhibiting the strongest signal strength received at the UE. Furthermore, the UE can continue to monitor the pattern of control beam pulses, and can notify the BS if the strongest received downlink beam changes, which typically happens as the UE move within a cell and/or between cells. Accordingly, the cell can be divided into sectors corresponding to the plurality of directional beams. The sectors corresponding to the directional beams can be utilized for spatial division multiple access, along with frequency division multiple access, time division multiple access, and/or code division multiple access, to increase the network capacity of cell.

Figure 10:
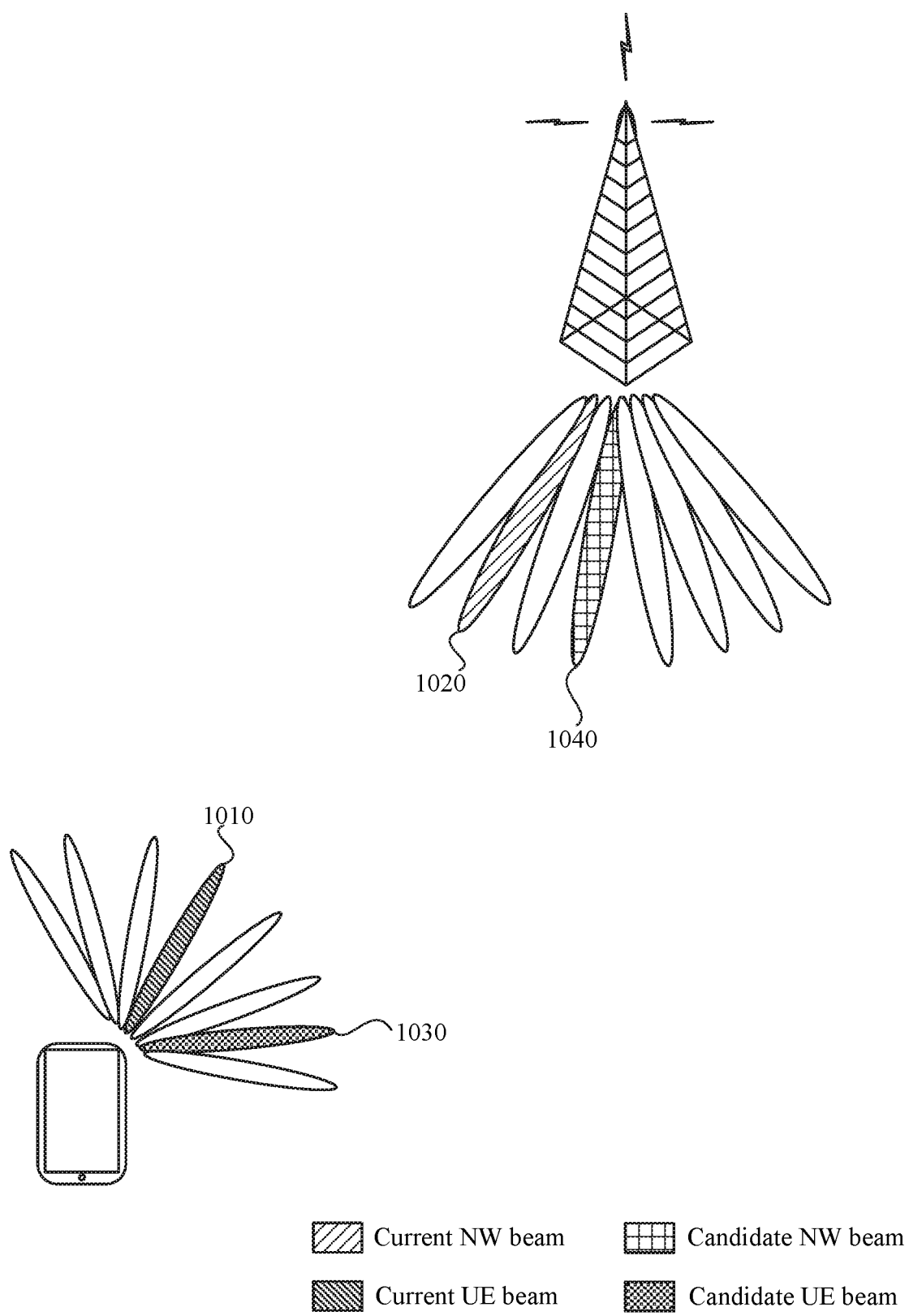
FIG. 10 illustrates hybrid digital/analog beamforming for use in a wireless system, in accordance with an example.

FIG. 10 illustrates hybrid digital/analog beamforming for use in a wireless system, in accordance with an example. In one aspect, hybrid beamforming can be used in both the Base Station (BS) and the UE. To initiate communication between the UE and the BS, a beam can be selected. The selected beam can be referred to as a current beam. The current beam may not be optimized for communication between the UE and the BS. As illustrated, the UE can use a current UE transmit beam 1010 to transmit one or more uplink signals, and the BS can use a corresponding current Network (NW) receive beam 1020 to receive the one or more uplink signals. Once communication between the UE and BS is established, measurements of the various beams can be performed and a candidate beam can be selected. The candidate beam may be selected based on transmit/receive power, path loss, interference levels, or other desired channel quality indicators. To enable flexible scheduling of resources, the UE can use a candidate UE transmit beam 1030 to transmit the one or more uplink signals, and the BS can use a candidate NW receive beam 1040 to receive the one or more uplink signals. A good UE transmit beam and NW receive beam pair can enhance the link budget.

Figure 11:
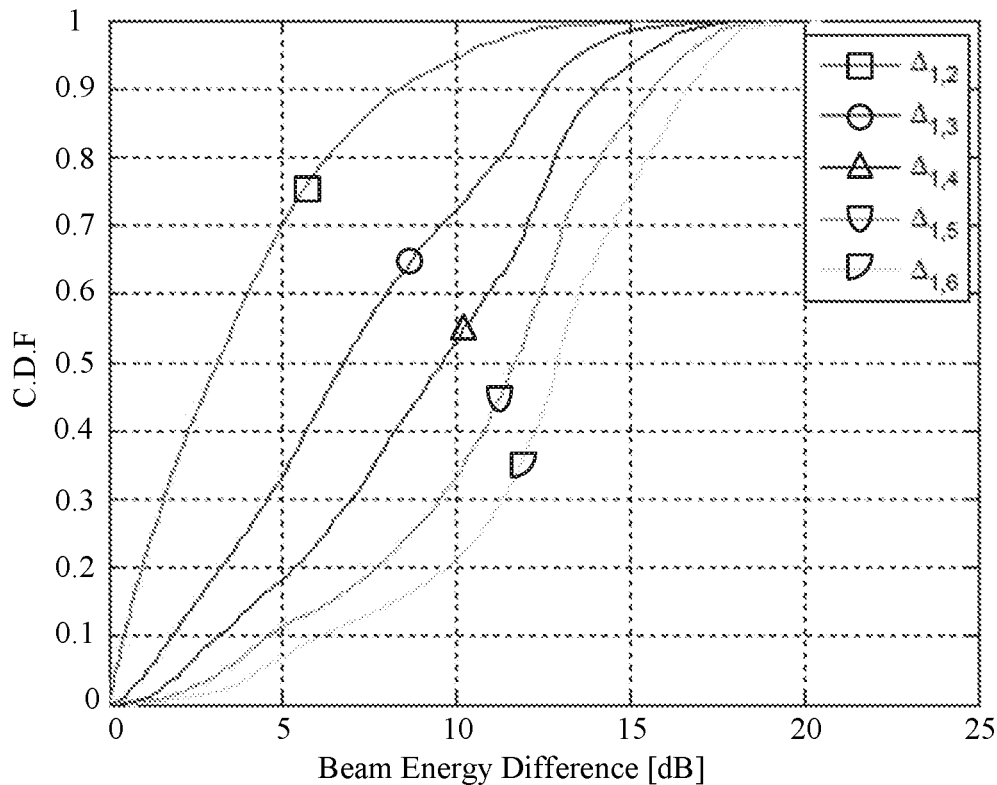
FIG. 11 illustrates pathloss in a multi-beam system, in accordance with an example.
Figure 12:
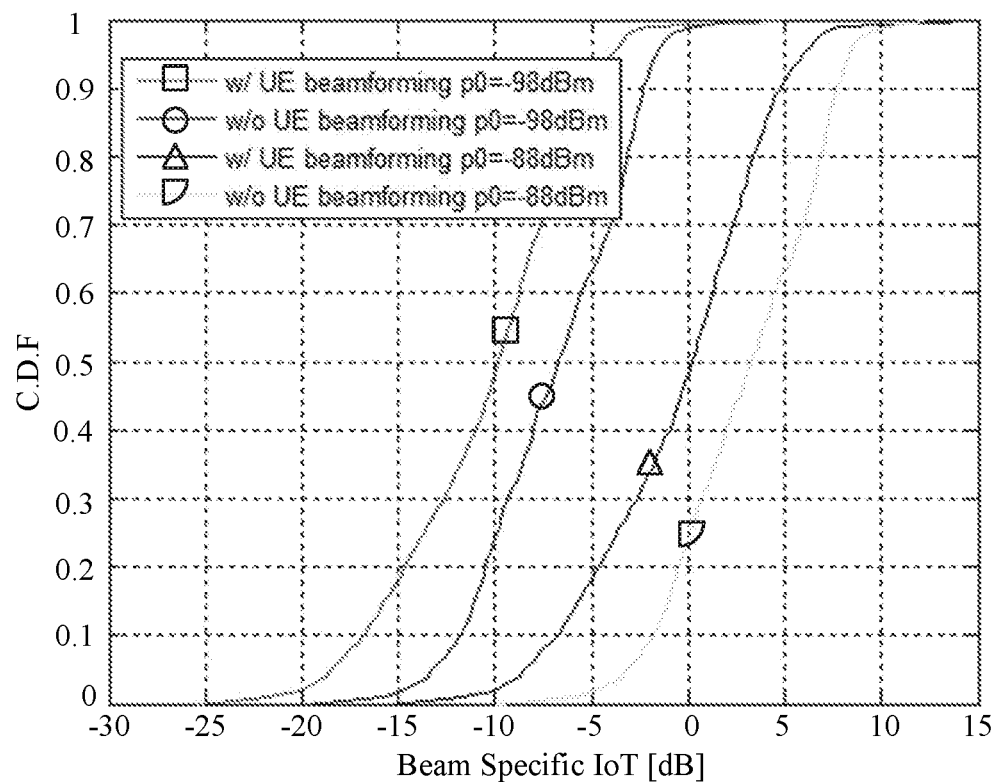
FIG. 12 illustrates interference in a multi-beam system, in accordance with an example.

Power control can be utilized for uplink communications to control the interference-over-thermal noise (IoT) and the near-far effect. FIG. 11 illustrates pathloss in a multi-beam system, in accordance with an example. In the figure, the beam energy difference, $\Delta_{i,j}=P_i-P_j$, observed from the top six beams versus the Cumulative Distribution Function (C.D.F.) is graphed, where $P_i$ denotes the beam energy of the selected beam and $P_j$ denotes the beam energy in the jth highest energy beam. As illustrated, the pathloss observed between different beams may not be the same. FIG. 12 illustrates interference in a multi-beam system, in accordance with an example. In the figure, the Interference over Thermal noise (IoT) observed versus the Cumulative Distribution Function (C.D.F.) is graphed for a number of target receiving power $P_0$ levels. As illustrated, the interference observed from different beams may also be different for different NW beams.

Figure 13:
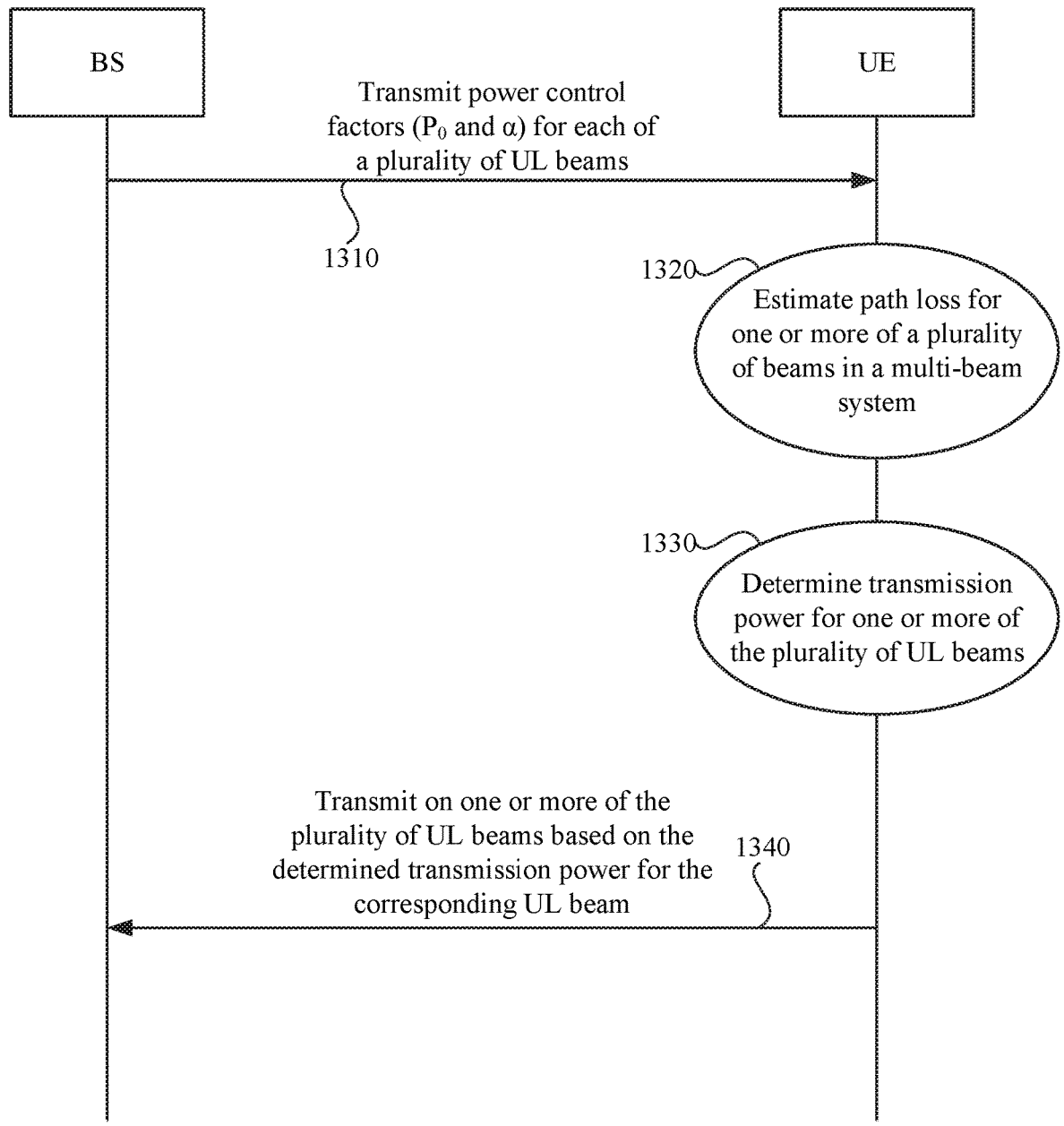
FIG. 13 illustrates a User Equipment (UE) transmit power control method of a multi-beam system, in accordance with an example.

FIG. 13 illustrates a User Equipment (UE) transmit power control method of a multi-beam system, in accordance with an example. In one aspect, one or more power control factors of one or more data channels and/or one or more control channels for corresponding ones of a plurality of beams in a multi-beam system can be sent from a Base Station (BS) to a UE 1310. For example, the UE can decode the one or more power control factors for each of the plurality of beams from higher level signaling received from a BS. For instance, the UE can decode a resource block power ($P_0$) and path loss compensation factor ($\alpha$) for a current transmit beam, and a resource block power ($P_0$) and path loss compensation factor ($\alpha$) for one or more candidate transmit beams.

In one aspect, multiple power control settings can be used for different transmission waveforms. For example, a first set of one or more power control factors can be decoded for a first waveform used for a first one of the plurality of uplink transmission beams, and a second set of one or more power control factors can be decoded for a second waveform used for a second one of the plurality of uplink transmission beams. Therefore, a first set of resource block power ($P_0$) and path loss compensation factor ($\alpha$) settings can be used for Cyclic Prefix Orthogonal Frequency Division Multiplexing (CP-OFDM), and a different set of resource block power ($P_0$) and path loss compensation factor ($\alpha$) settings can be used for Discrete Fourier Transform Spread Orthogonal Frequency Division Multiplexing (DFT-S-OFDM) waveform transmissions.

In one aspect, the higher level signaling may be encoded in a System Information Block (SIB), a Master Information Block (MIB), a Radio Resource Control (RRC), or a Media Access Control (MAC) Control Element (CE). The configurations can include one or more of the resource block power ($P_0$) for the extended Physical Uplink Shared Channel (xPUSCH), the resource block power ($P_0$) for the extended Physical Uplink Control Channel (xPUCCH), the path loss compensation factor ($\alpha$), a flag for accumulation, and a Beam Reference Signal (BRS) index. The flag for accumulation can denote whether the accumulation is enabled for Transmit Power Commands (TPC). The BRS index can be used to indicate the Network (NW) beam where the User Equipment (UE) can estimate the Path Loss (PL).

In a System Information Block (SIB) implementation, different power control factors can be set. The different power control factors can be transmitted by the SIB related channel with transmit (Tx) beam sweeping, such as the enhanced Physical Broadcast Channel (ePBCH). The beams in the SIB implementation can be one-to-one mapped to the beams in the Beam Reference Signal (BRS), so that the UE can determine the resource block power ($P_0$) for each beam after decoding the SIB. In one instance, the scramble sequence for the SIB channel or the ePBCH can be determined by the BRS.

In another option, the System Information Block (SIB) can include the resource block power ($P_0$) for each of the plurality of beams. The configured resource block power ($P_0$) can be one-to-one mapped to the beams in the Beam Reference Signal (BRS). The number of resource block power ($P_0$) can be determined by the period of beam reoccurrence in the BRS.

In yet another option, the BS can define multiple power control processes, the size of which can be N. Each power control process can have a different configuration of the resource block power ($P_0$). The Downlink Control Indicator (DCI), a power control process indicator can be added, and the bit width for the indicator can be $\log_2 N$.

In one aspect, the power control factor ($P_0$) can be a function of one or more of interference, thermal noise, a target Signal Interference Noise Ratio (SINR), or the like, for each beam. For example, the power control factor ($P_0$) for a given beam can be expressed according to Equation 1.

$$P_0 = \alpha(SINR_0 + P_{N1}) + (1-\alpha)P_{max} \qquad (1)$$

where $SINR_0$ denotes a target SINR, $P_{N1}$ indicates the noise and interference power in one resource block (RB), and $P_{max}$ is the maximum transmit power that can be configured by higher layers or based on the physical hardware. In another example, the power control factor ($P_0$) can be expressed according to Equation 2.

$$P_0 = SINR_0 + P_{N1} \qquad (2)$$

In one aspect, a path loss (PL) for the corresponding ones of the plurality of uplink transmission beams can be estimated 1320, as depicted in FIG. 13. For example, the UE can estimate the path loss (PL) based on a Reference Symbol Received Power (RSRP) received from the base station on each of the plurality of NW beams of the NW-UE beam pairs. For instance, the UE can estimate the path loss (PL) on the current UE beam from the Reference Signal ($R_0$ or the combination of $R_0$ and $R_1$) received on the downlink of the current NW-UE beam pair, and the path loss (PL) on the candidate UE beam from the Reference Signal received on the downlink of the candidate NW-UE beam pair.

In one aspect, a transmission power level ($P_{tx}$) can be determined for one or more of the plurality of UE uplink transmission beams as a function of the one or more decoded power control factors and the measured path loss for corresponding ones of the plurality of the plurality of uplink transmission beams 1330. For example, the UE can estimate the power spectral density ($PSD_{tx}$) for the $j^{th}$ uplink transmission beam according to Equation 3.

$$PSD_{tx(j)} = \min\{P_{0(j)} + \alpha_j \cdot PL_j, P_{max,PSD}\} \qquad (3)$$

where PL is the pathloss for the $j^{th}$ uplink transmission beam and $P_{max,PSD}$ indicates the maximum PSD. In another example, the UE can estimate the transmit power ($P_{tx}$) for the $j^{th}$ uplink transmission beam according to Equation 4.

$$P_{tx(j)} = \min\{P_{0(j)} + 10 \cdot \log(M) + \alpha_j \cdot PL_j, P_{max}\} \qquad (4)$$

Where M is the number of Physical Resource Blocks (PRB), and $P_{max}$ is the maximum transmission power for a PRB.

In one aspect, one or more based band circuitry, one or more Radio Frequency (RF) circuitry and/or one or more front end module (FEM) circuitry can be configured to transmit on one or more of the plurality of uplink transmission beams based on the determined transmission power for corresponding ones of the plurality of uplink transmission beams 1340. For example, a memory interface of the UE can store an indicator of the determined transmission power for each of the plurality of uplink transmission beams in a memory. The one or more based band circuitry, one or more Radio Frequency (RF) circuitry and/or one or more front end module (FEM) circuitry can be configured to transmit on one or more of the plurality of uplink transmission beams based on the indicator of the determined transmission power for each of the plurality of uplink transmission beams stored in the memory. The determined transmission power can be used for an Open Loop Power Control (OLPC) portion of a Transmit Power Control (TPC) that includes an Open Loop Power Control (OLPC) scheme and a Closed Loop Power Control (CLPC) scheme.

Figure 14:
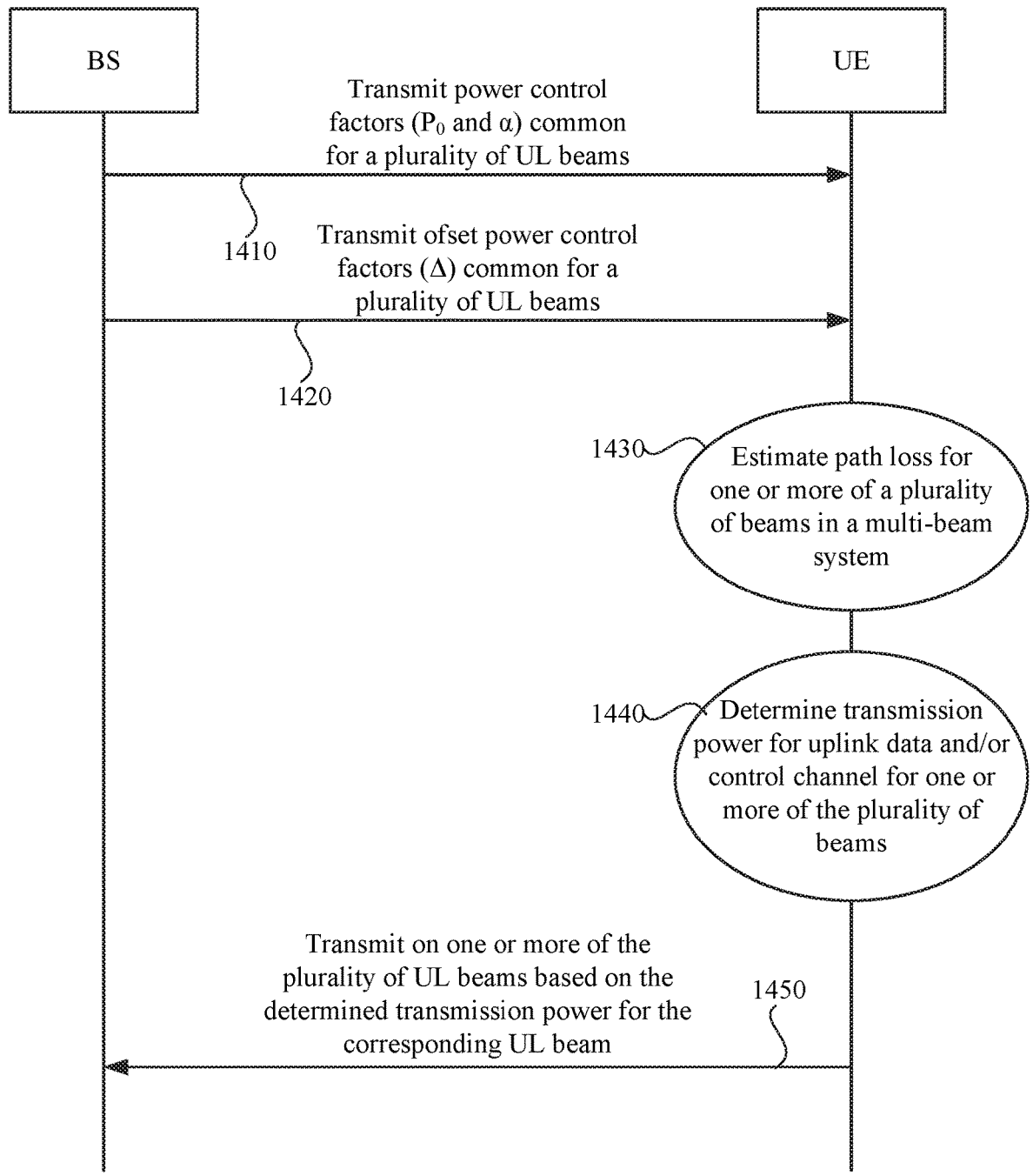
FIG. 14 illustrates a User Equipment (UE) transmit power control method of a multi-beam system, in accordance with another example.

FIG. 14 illustrates a User Equipment (UE) transmit power control method of a multi-beam system, in accordance with another example. In one aspect, one or more power control factors common for a plurality of beams in a multi-beam system can be sent from a Base Station (BS) to a UE 1410. For example, the UE can decode a resource block power ($P_0'$) and path loss compensation factor ($\alpha$) for both a current transmit beam and a candidate transmit beam. The common configuration resource block power ($P_0'$) and path loss compensation factor ($\alpha$) can be decoded from higher level signaling received from a base station.

In one aspect, multiple power control setting can be used for different transmission waveforms. For example, a first set of one or more power control factors can be decoded for a first waveform used for a first one of the plurality of uplink transmission beams, and a second set of one or more power control factor can be decoded for a second waveform used for a second one of the plurality of uplink transmission beams. Therefore, a first set of resource block power ($P_0$) and path loss compensation factor ($\alpha$) settings can be used for Cyclic Prefix Orthogonal Frequency Division Multiplexing (CP-OFDM), and a different set of resource block power ($P_0$) and path loss compensation factor ($\alpha$) settings can be used for Discrete Fourier Transform Spread Orthogonal Frequency Division Multiplexing (DFT-S-OFDM) waveform transmissions.

In one aspect, the higher level signaling may be encoded in a System Information Block (SIB), a Master Information Block (MIB), Radio Resource Control (RRC), or Media Access Control (MAC) Control Element (CE). The configuration can include one or more of the common resource block power ($P_0'$) for the extended Physical Uplink Shared Channel (xPUSCH), the common resource block power ($P_0'$) for the extended Physical Uplink Control Channel (xPUCCH), the path loss compensation factor (α), a flag for accumulation, and a Beam Reference Signal (BRS) index. The flag for accumulation can denote whether the accumulation is enabled for Transmit Power Commands (TPC). The BRS index can be used to indicate the Network (NW) beam where the User Equipment (UE) can estimate the Path Loss (PL).

In one aspect, the power control factor ($P_0$) can be a function of one or more of interference, thermal noise, target Signal Interference Noise Ratio (SINR), or the like, for each beam. For example, the common configuration power control factor ($P_0'$) can be expressed according to Equation 5.

$$P_0' = \alpha(SINR_0 + P_{N1}) + (1-\alpha)P_{max} \quad (5)$$

In another example, the common power control factor ($P_0'$) can be expressed according to Equation 6.

$$P_0' = SINR_0 + P_{N1} \quad (6)$$

In one aspect, one or more offset power control factors for each of the plurality of beams can be sent from the base station to the UE 1420. For example, the UE can decode an offset resource block power (Δ) for a current transmit beam, and an offset resource block power (Δ) for a candidate transmit beam. The configuration can include one or more of the offset resource block power (Δ) for an extended Sounding Reference Signal (xSRS), the offset resource block power (Δ) for different extended Physical Uplink Control Channel (xPUCCH) formats, and the offset resource block power (Δ) for different Modulation and Coding Schemes (MCS). The offset resource block power (Δ) for an xSRS can denote the targeting receive (Rx) power offset between the xSRS and the extended Physical Uplink Shared Channel (xPUSCH). The offset resource block power (Δ) for different extended Physical Uplink Control Channel (xPUCCH) formats can denote the targeting receive (Rx) power offset amount different xPUCCH formats based on the ($P_0'$) for xPUCCH. The offset resource block power (Δ) for different Modulation and Coding Schemes (MCS) can denote the targeting receive (Rx) power offset among different MCSs based on ($P_0'$) for xPUSCH.

In one aspect, offset resource block power (Δ) can be a function of a difference in resource block power ($P_0$) for corresponding ones of the plurality of uplink transmission beams. In one aspect, the range of a given power control factor for the plurality of uplink transmission beams may be relatively small. Accordingly, transmission of a common power control factor and a plurality of offset resource power control factors may be represented by less bits of data than transmission of a plurality of power control factors. Therefore, use of offset resource power control factors may reduce signaling overhead of Uplink (UL) beam the power control method.

In one aspect, a path loss (PL) for each of the plurality of uplink transmission beams can be estimated 1430. For example, the UE can estimate the path loss (PL) based on a Reference Symbol Received Power (RSRP) received from the base station on each of the plurality of NW beams of the NW-UE beam pairs. For instance, the UE can estimate the path loss (PL) on the current UE beam from the Reference Signal ($R_0$ or the combination of $R_0$ and $R_1$) received on the downlink of the current NW-UE beam pair, and the path loss (PL) on the candidate UE beam from the Reference Signal received on the downlink of the candidate NW-UE beam pair.

In one aspect, a transmission power level ($P_{tx}$) can be determined for each of the plurality of UE uplink transmission beams as a function of the decoded common power control factors, the offset resource power control factors for each of the plurality of uplink transmission beams, and the estimated path loss for each of the plurality of uplink transmission beams 1440. For example, the UE can estimate the power spectral density ($PSD_{tx}$) for the $j^{th}$ uplink transmission beam according to Equation 7.

$$PSD_{tx(j)} = \min\{P_{0(j)}' + \Delta_j + \alpha_j \cdot PL_j, P_{max,PSD}\} \quad (7)$$

In another example, the UE can estimate the transmit power ($P_{tx}$) for the $j^{th}$ uplink transmission beam according to Equation 8.

$$P_{tx(j)} = \min\{P_{0(j)}' + \Delta_j + 10 \cdot \log(M) + \alpha_j \cdot PL_j, P_{max}\} \quad (8)$$

In one aspect, one or more based band circuitry, one or more Radio Frequency (RF) circuitry and/or one or more front end module (FEM) circuitry can be configured to transmit on one or more of the plurality of uplink transmission beams based on the determined transmission power for each respective one of the plurality of uplink transmission beams 1450. For example, a memory interface of the UE can store an indicator of the determined transmission power for each of the plurality of uplink transmission beams in a memory. The one or more based band circuitry, one or more Radio Frequency (RF) circuitry and/or one or more front end module (FEM) circuitry can be configured to transmit on one or more of the plurality of uplink transmission beams based on the indicator of the determined transmission power for each of the plurality of uplink transmission beams stored in the memory. The determined transmission power can be used for an Open Loop Power Control (OLPC) portion of a Transmit Power Control (TPC) that includes an Open Loop Power Control (OLPC) scheme and a Closed Loop Power Control (CLPC) scheme.

Figure 15:
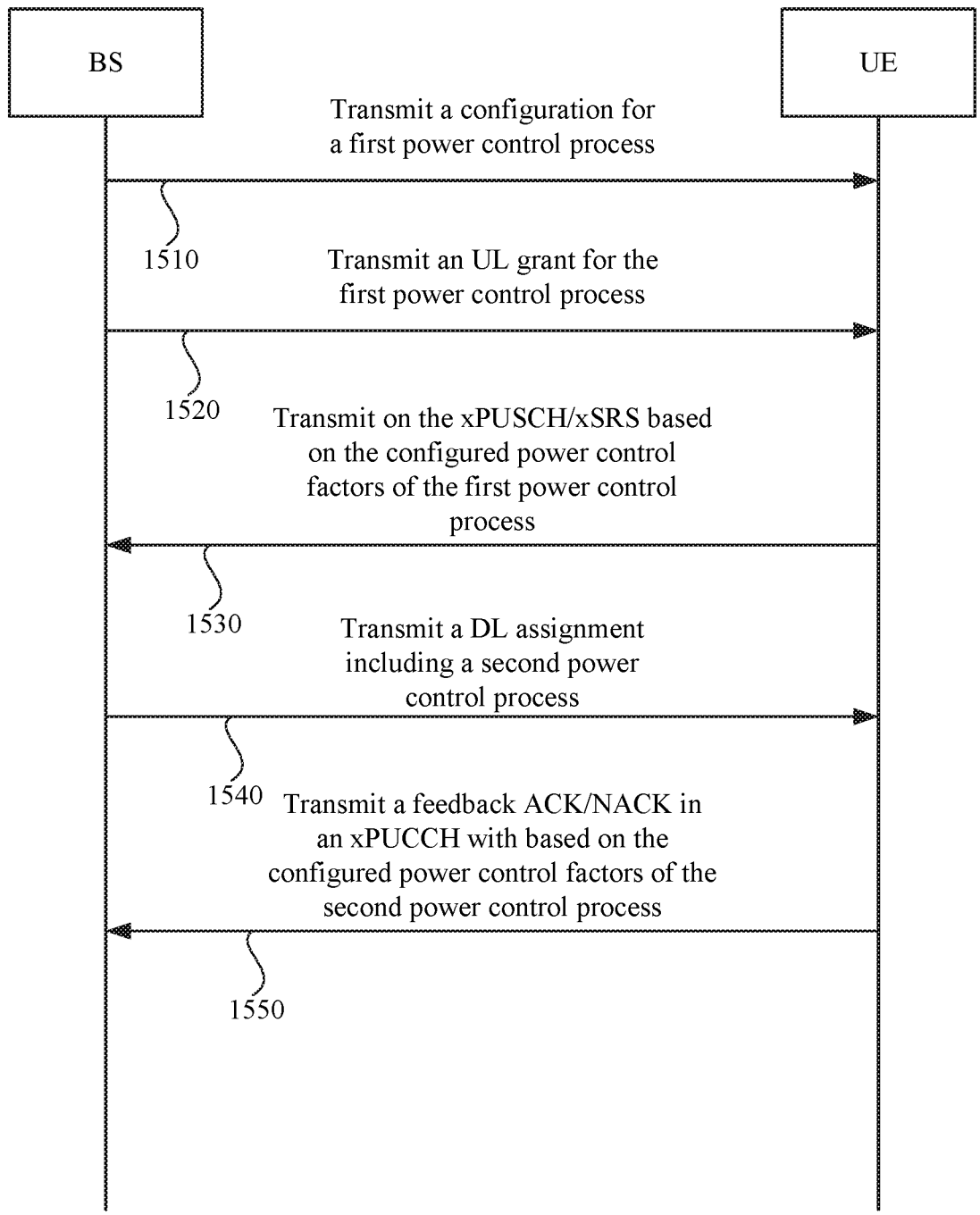
FIG. 15 illustrates a User Equipment (UE) transmit power control method of a multi-beam system, in accordance with another example.

FIG. 15 illustrates a User Equipment (UE) transmit power control method of a multi-beam system, in accordance with another example. In one aspect, a power control process can be indicated by an uplink grant for an extended Physical Uplink Shared Channel (xPUSCH) and an extended Sounding Reference Signal (xSRS). For example, the Base Station (BS) can transmit a configuration for a first power control process (PC0) to the UE 1510. The BS can also transmit an UL grant for the first power control process (PC0) to the UE 1520. The UE can transmit on the extended Physical Uplink Shared Channel (xPUSCH)/Sounding Reference Signal (xSRS) based on the configured power control factors in the first power control process (PC0) 1530. For the extended Physical Uplink Control Channel (xPUCCH), the power control process can be indicated by a downlink assignment. For example, the BS can transmit a downlink assignment including a second power control process (PC1) 1540. The UE can transmit to the BS a feedback acknowledgement/negative acknowledgement (ACK/NACK) in an extended Physical Uplink Control Channel (xPUCCH) with the power control factors in the first power control process (PC0) 1550. In one aspect, when a new power control process is established or the power control process gets reconfigured an accumulation flag should be reset.

In another aspect, the Beam Reference Signal (BRS) index can be indicated in the Downlink Control Information (DCI). The UE transmit (Tx) beam index can be indicated in the Downlink Control Information (DCI), as the beam energy could change if different UE beams are applied. The UE transmit (Tx) beam index can be determined by the latest UE transmit (Tx) beam training signal, such as the extended Physical Random Access Channel (xPRACH) or the extended Sounding Reference Signal (xSRS). The beam index can indicate one or more beams carried by the (BRS, Beam Refinement Reference Signal (BRRS), Channel State Information Reference Signal (CSI-RS), or the like. Which signal that is being indicated can be configured by a higher layer signaling.

In another aspect, different power control settings can be used for different modulations techniques. For example, the UE can decode a first set of different resource block powers ($P_0$) and path loss compensation factors ($\alpha$) for corresponding ones of a plurality of beams for transmission using Cyclic Prefix Orthogonal Frequency Division Multiplexing (CP-OFDM), and a second set of different resource block powers ($P_0$) and path loss compensation factors ($\alpha$) for corresponding ones of a plurality of beams for transmission using Discrete Fourier Transform spread orthogonal Frequency Division Multiplexing (DFT-S-OFDM). In another example, the UE can decode a set of different resource block powers ($P_0$) and path loss compensation factors ($\alpha$) for corresponding ones of a plurality of beams for transmission using Cyclic Prefix Orthogonal Frequency Division Multiplexing (CP-OFDM), and a common resource block power ($P_0$) and path loss compensation factor ($\alpha$) with different offset resource block powers ($\Delta$) for corresponding ones of the plurality of beams for transmission using Discrete Fourier Transform spread orthogonal Frequency Division Multiplexing (DFT-S-OFDM).

Figure 16:
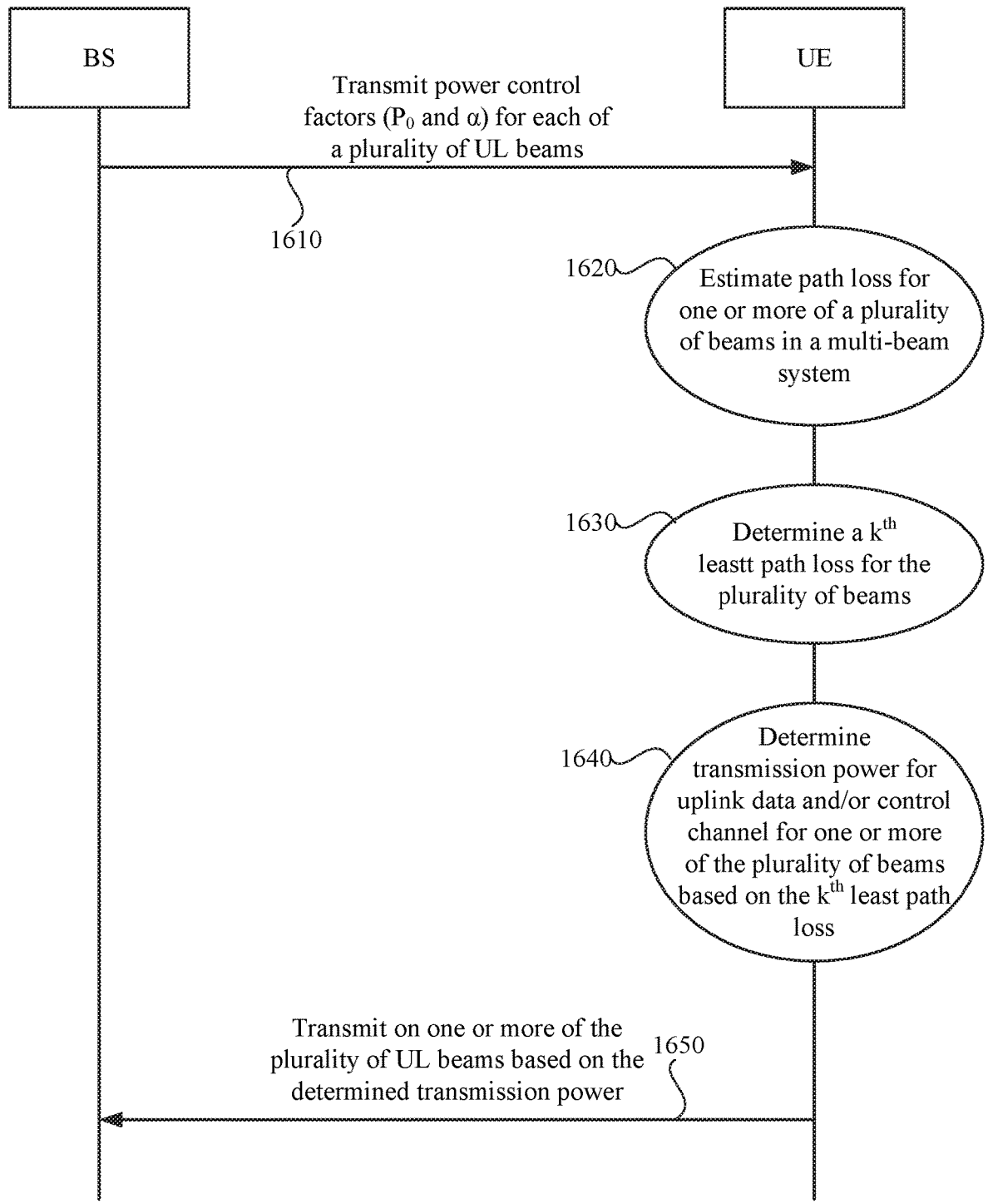
FIG. 16 illustrates a User Equipment (UE) Beam Management (BM) transmit power control method of a multi-beam system, in accordance with an example.

FIG. 16 illustrates a User Equipment (UE) Beam Management (BM) transmit power control method of a multi-beam system, in accordance with an example. In one aspect, one or more power control factors of one or more Beam Management Signals (BMS) can be sent from a Base Station to a UE 1610. For example, the UE can decode the one or more power control factors from higher level signaling received from a BS. For instance, the UE can decode a resource block power ($P_0$) and path loss compensation factor ($\alpha$) for a Physical Random Access Channel (PRACH), a Sounding Reference Signal (SRS), a Physical Uplink Control Channel (PUCCH), or other beam sweeping control signals. The one or more power control factors can be configured independently for different Beam Management Signals (BMS).

In one aspect, the power control factor ($P_0$) can be a function of one or more of interference, thermal noise, target Signal Interference Noise Ratio (SINR), or the like, for each beam. For example, the power control factor ($P_0$) can be expressed according to Equation 1.

$$P_0 = \alpha(SINR_0 + P_{N1}) + (1-\alpha)P_{max} \quad (1)$$

where $SINR_0$ denotes a target Signal Interference Noise Ratio (SINR), and $P_{N1}$ indicates the noise and interference power in one resource block (RB). In another example, the power control factor ($P_0$) can be expressed according to Equation 2.

$$P_0 = SINR_0 + P_{N1} \quad (2)$$

In one aspect, a path loss (PL) for each of the plurality of Uplink Beam Management Signals (UL BMS) can be estimated 1620. For example, the path loss (PL) measurement can be performed based on the measurement of the Downlink Beam Measurement Reference Signal (DL BM RS) over multiple repetitions for each of a plurality of beam pair links using a common downlink transmit power.

In one aspect, a $k^{th}$ least path loss ($PL_{k^{th}}$) for the plurality of Uplink Beam Management Signals (UL BMS) can be determined 1630. For example, the least (e.g., k=1) path loss ($PL_{1^{th}}$) of the plurality of beams can be determined. In another example, the second (e.g., k=2) or third least (e.g., k=3) path loss of the plurality of beams can be determined.

Figure 17:
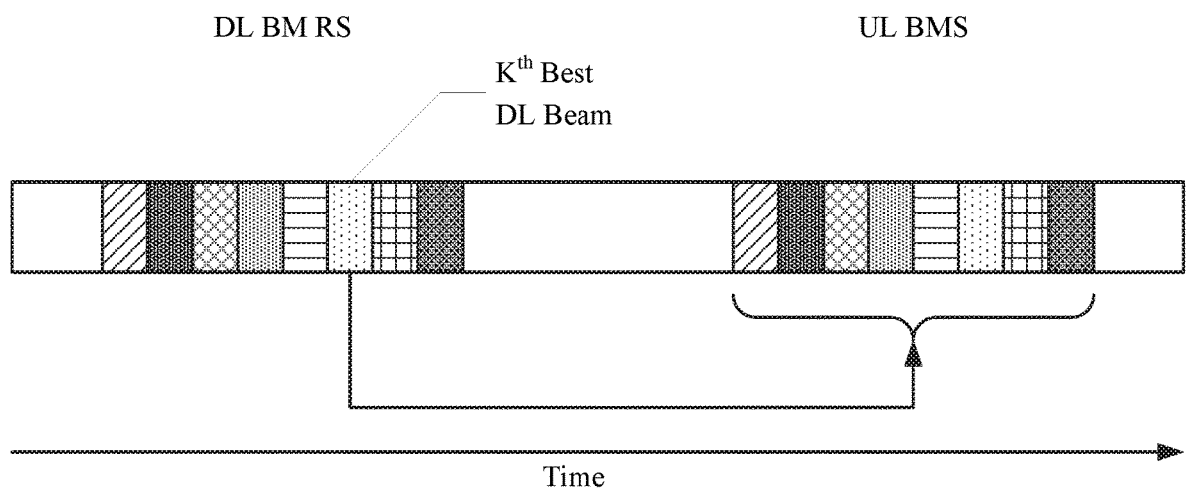
FIG. 17 illustrates power control of a Beam Management Signal (BMS), in accordance with an example.

The $k^{th}$ least path loss ($PL_{k^{th}}$) can correspond to the $k^{th}$ best DL beam. As illustrated in FIG. 17, the path loss ($PL_{k^{th}}$) is determined from the one of the plurality of Downlink Beam Management Signals (DL BMS) having the $K^{th}$ best DL beam signal strength received at the UE, where DL BMS indicates the DL reference signal used for beam management, such as CSI-RS for beam management, synchronization signal block (SS-block).

In one aspect, a transmission power level ($P_{tx}$) can be determined for each of the plurality of UE Uplink Beam Management Signal (UL BMS) transmission (Tx) beams as a function of the one or more decoded power control factors and the determined $k^{th}$ least path loss ($PL_{k^{th}}$) of the Downlink Beam Measurement Reference Signal (DL BM RS) 1640. For example, the UE can estimate the power spectral density ($PSD_{tx}$) for the plurality of uplink beam measurement signal (UL BMS) transmission power according to Equation 9.

$$PSD_{tx(f)} = \min(P_{max}, P_0 + \alpha \cdot PL_{k^{th}}) \quad (9)$$

In another example, a power control offset ($\hat{\Delta}$) can be used to increase the transmit power so that the Base Station (BS) can receive more Beam Management Signals (BMS). The UE can estimate the transmit power ($P_{tx}$) for the uplink beam management signal transmission beam with the power control offset ($\hat{\Delta}$) can be calculated according to Equation 10.

$$PSD_{tx(f)} = \min(P_{max}, P_0 + \alpha \cdot PL_{k^{th}} + \hat{\Delta}) \quad (10)$$

The power control offset ($\hat{\Delta}$) can be pre-defined or configured by a high layer signaling, or by Downlink Control Information (DCI). In another example, the power control offset ($\hat{\Delta}$) can be can be split into two parts, wherein a first part ($\hat{\Delta}_r$) can be configured by a high layer signaling and the second part ($\hat{\Delta}_d$) can be configured by Downlink Control Information (DCI). In such case, the UE can estimate the transmit power ($P_{tx}$) for the uplink beam management signal transmission beam according to Equation 11.

$$PSD_{tx(f)} = \min(P_{max}, P_0 + \alpha \cdot PL + \hat{\Delta}_r + \hat{\Delta}_d) \quad (11)$$

In one aspect, one or more based band circuitry, one or more Radio Frequency (RF) circuitry and/or one or more front end module (FEM) circuitry can be configured to transmit an Uplink Beam Management Signal (UL BMS) on one or more of the plurality of uplink transmission beams based on the determined transmission power 1650. The beam management signal can be a Physical Random Access Channel (PRACH), a Sounding Reference Signal (SRS), Physical Uplink Control Channel (PUCCH), or other signal where beam sweeping can be applied. For example, a memory interface of the UE can store an indicator of the determined UL BMS transmission (Tx) power for each of the plurality of uplink transmission beams in a memory. The one or more based band circuitry, one or more Radio Frequency (RF) circuitry and/or one or more front end module (FEM) circuitry can be configured to transmit on one or more of the plurality of uplink transmission beams based on the indicator of the determined transmission power for each of the plurality of UL BMS stored in the memory. As illustrated in FIG. 17, the determined transmission power is used for transmission on the plurality of UL BMS.

Figure 18:
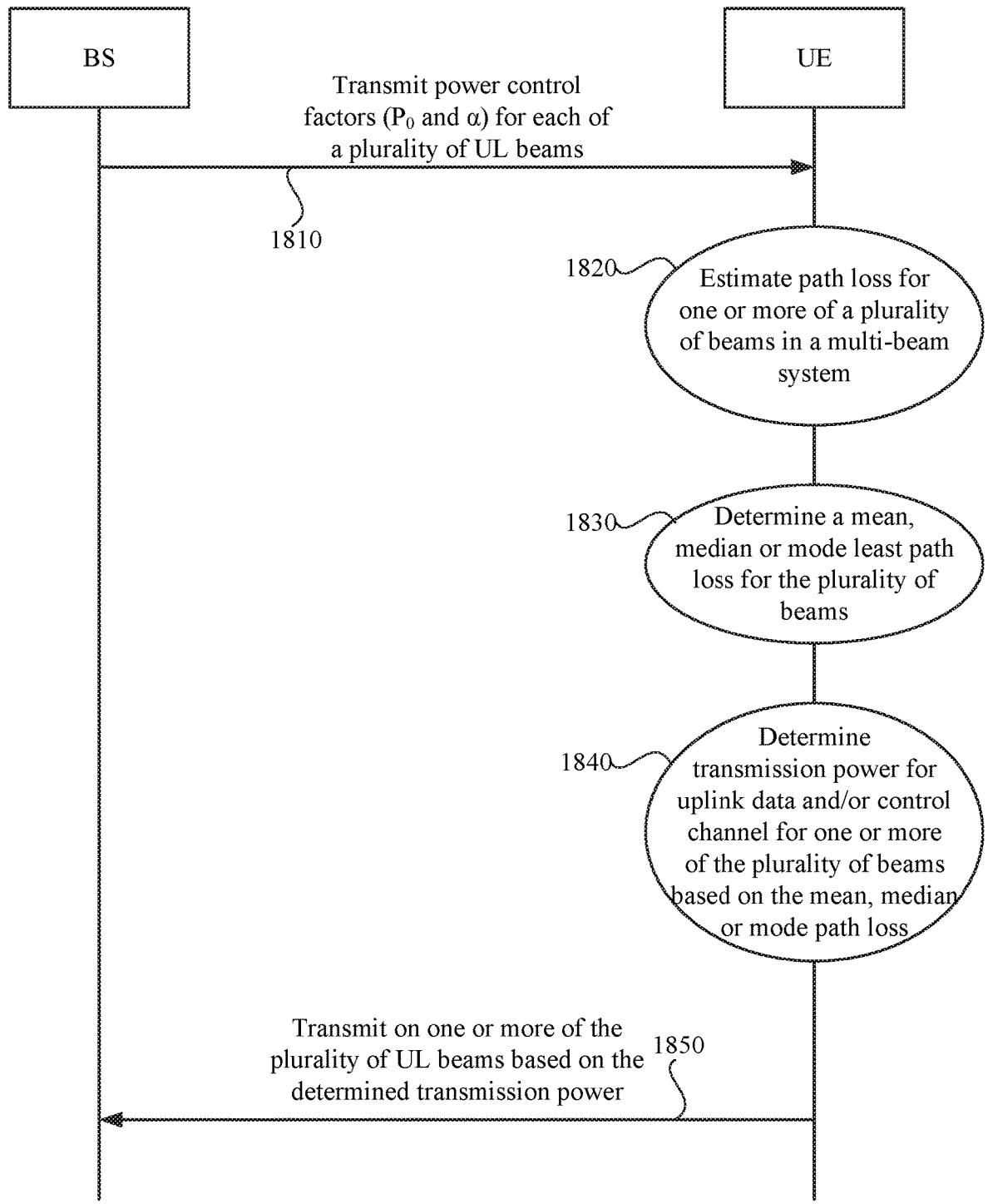
FIG. 18 illustrates a User Equipment (UE) Beam Management (BM) transmit power control method of a multi-beam system, in accordance with an example.

FIG. 18 illustrates a User Equipment (UE) Beam Management (BM) transmit power control method of a multi-beam system, in accordance with an example. In one aspect, one or more power control factors of one or more Beam Management Signals (BMS) can be sent from a Base Station (BS) to a UE 1810. For example, the UE can decode the one or more power control factors from higher level signaling received from a base station. For instance, the UE can decode a resource block power ($P_0$) and path loss compensation factor ($\alpha$) for a Physical Random Access Channel (PRACH), a Sounding Reference Signal (SRS), a Physical Uplink Control Channel (PUCCH), or other beam sweeping control signals. The one or more power control factors can be configured independently for different Beam Management Signals (BMS).

In one aspect, the power control factor ($P_0$) can be a function of one or more of interference, thermal noise, target Signal Interference Noise Ratio (SINR), or the like, for each beam. For example, the power control factor ($P_0$) can be expressed according to Equation 1.

$$P_0 = \alpha(SINR_0 + P_m) + (1-\alpha)P_{max} \quad (1)$$

where $SINR_0$ denotes a target Signal Interference Noise Ratio (SINR), and $P_{N1}$ indicates the noise and interference power in one resource block (RB). In another example, the power control factor ($P_0$) can be expressed according to Equation 2.

$$P_0 = SINR_0 + P_{N1} \quad (2)$$

Figure 19:
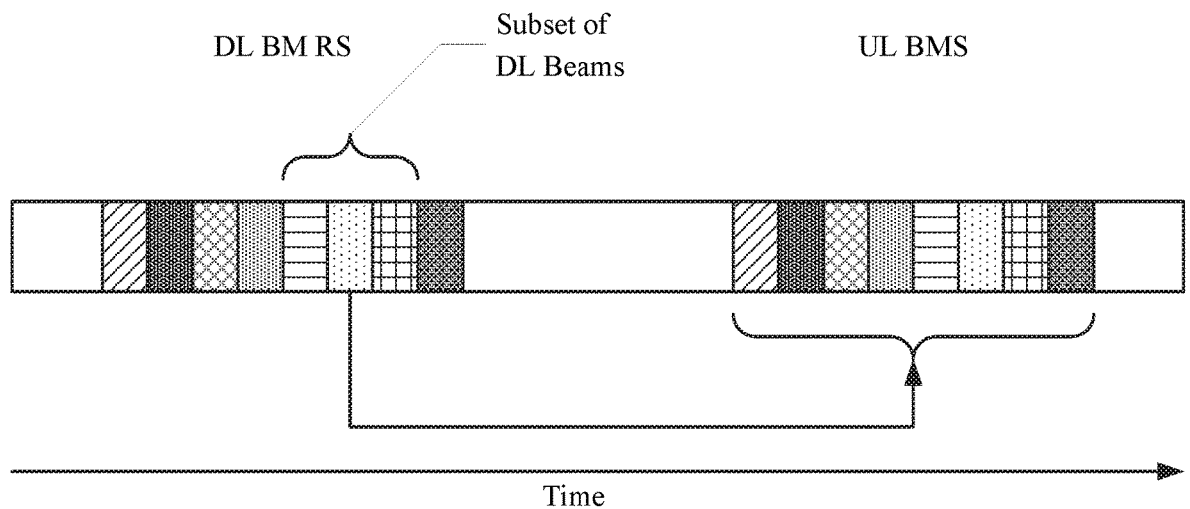
FIG. 19 illustrates power control of a Beam Management Signal (BMS), in accordance with another example.

In one aspect, a path loss (PL) for each of the plurality of Uplink Beam Management Signals (UL BMS) or a subset of PLs of the plurality of UL BMSs can be estimated 1820. For example, the path loss (PL) measurement can be performed based on the measurement of the Downlink Beam Measurement Reference Signal (DL BM RS) over multiple repetitions for each of a plurality of beam pair links using a common downlink transmit power. In one instance, the subset of path losses (PL) the plurality of UL BMSs can be estimated from a pre-defined subset of DL BM RS. In another instance, the subset of DL BM RS can be configured by a higher layer signaling. In yet another instance, the subset of DL BM RS can be configured by Downlink Control Information (DCI). In yet another instance, the subset of DL BM RS can be a predetermined number of highest power level Reference Signal Receiving Power (RSRP). As illustrated in FIG. 19, the path loss is determined from a subset of the plurality of Downlink Beam Management Signals (DL BMS)

In one aspect, a mean, median, or mode path loss ($\overline{PL}$) for the subset of the plurality of Uplink Beam Management Signals (UL BMS) can be determined 1830. For example, the average path loss (PL) of a predetermined subset of the plurality of beams can be determined. In another example, the median path loss (PL) of a configured subset of the plurality of beams can be determined.

In one aspect, a transmission power level ($P_{tx}$) can be determined for each of the plurality of UE Uplink Beam Management Signal (UL BMS) transmission (Tx) beams as a function of the one or more decoded power control factors and the determined mean, median, or mode path loss ($\overline{PL}$) 1840. For example, the UE can estimate the power spectral density ($PSD_{tx}$) for the plurality of uplink beam measurement signal (UL BMS) transmission power according to Equation 9.

$$PSD_{tx(j)} = \min(P_{max}, P_0 + \alpha \cdot \overline{PL}) \quad (9)$$

In another example, a power control offset ($\Delta$) can be used to increase the transmit power so that the Base Station (BS) can receive more Beam Management Signals (BMS). The UE can estimate the transmit power ($P_{tx}$) for the uplink beam management signal transmission beam with the power control offset ($\Delta$) can be calculated according to Equation 10.

$$PSD_{tx(j)} = \min(P_{max}, P_0 + \alpha \cdot \overline{PL} + \hat{\Delta}) \quad (10)$$

The power control offset ($\hat{\Delta}$) can be pre-defined or configured by a high layer signaling, or by Downlink Control Information (DC). In another example, the power control offset ($\hat{\Delta}$) can be can be split into two parts, wherein a first part ($\hat{\Delta}_r$) can be configured by a high layer signaling and the second part ($\hat{\Delta}_d$) can be configured by Downlink Control Information (DC). In such case, the UE can estimate the transmit power ($P_{tx}$) for the uplink beam management signal transmission beam according to Equation 11.

$$PSD_{tx(j)} = \min(P_{max}, P_0 + \alpha \cdot \overline{PL} + \hat{\Delta}_r + \hat{\Delta}_d) \quad (11)$$

In one aspect, one or more based band circuitry, one or more Radio Frequency (RF) circuitry and/or one or more front end module (FEM) circuitry can be configured to transmit an Uplink Beam Management Signal (UL BMS) on one or more of the plurality of uplink transmission beams based on the determined transmission power 1850. The beam management signal can be a Physical Random Access Channel (PRACH), a Sounding Reference Signal (SRS), Physical Uplink Control Channel (PUCCH), or other signal where beam sweeping can be applied. For example, a memory interface of the UE can store an indicator of the determined Uplink Beam Management Signal (UL BMS) transmission (Tx) power for each of the plurality of uplink transmission beams in a memory. The one or more based band circuitry, one or more Radio Frequency (RF) circuitry and/or one or more front end module (FEM) circuitry can be configured to transmit on one or more of the plurality of uplink transmission beams based on the indicator of the determined transmission power for each of the plurality of Uplink Beam Management Signal (UL BMS) stored in the memory. As illustrated in FIG. 19, the determined transmission power is used for transmission on the plurality of UL BMS and the pathloss is calculated by averaging the pathloss from a sub-set of beams.

In one aspect, the transmit power control techniques can advantageously reduce, intra-cell interference, inter-cell interference, interference over thermal noise, the near-far effect, and the like. Accordingly, the transmit power control techniques can advantageously increase the link budget on the network.

EXAMPLES

The following examples pertain to specific technology embodiments and point out specific features or elements that may be used or otherwise combined in achieving such embodiments.

Embodiment 1 includes an apparatus of a user equipment (UE) operable to configure uplink transmission power in a multi-beam system, the UE comprising: one or more processors configured to, decode, at the UE, higher level signaling received from a Base Station (BS) including one or more power control factors for corresponding ones of a plurality of uplink transmission beams; estimate, at the UE, a path loss for corresponding ones of the plurality of uplink transmission beams; and determine, at the UE, a transmission power of one or more of the plurality of uplink transmission beams as a function of the one or more decoded power control factors and the estimated path loss of the corresponding ones of the plurality of uplink transmission beams; and a memory interface configured to send to a memory one or more indicators of the determined transmission power of the corresponding ones of the plurality of uplink transmission beams.

Embodiment 2 includes the apparatus of embodiment 1, wherein the one or more processors are further configured to encode an uplink signal for transmission on one or more of the plurality of uplink transmission beams based on the determined transmission power of the corresponding ones of the plurality of uplink transmission beams.

Embodiment 3 includes the apparatus of embodiments 1 or 2, wherein the determined transmission power can be used for an Open Loop Power Control (OLPC) portion of a Transmit Power Control (TPC).

Embodiment 4 includes the apparatus of embodiment 1, wherein the one or more power control factors includes a resource block power ($P_0$) for each of the plurality of uplink transmission beams.

Embodiment 5 includes the apparatus of embodiment 4, wherein the resource block power ($P_0$) is a function of one or more of an interference, a thermal noise and a target signal interference noise ratio for each of the plurality of uplink transmission beams.

Embodiment 6 includes the apparatus of embodiment 4, wherein the one or more power control factors includes a path loss compensation factor ($\alpha$) for each of a plurality of uplink transmission beams.

Embodiment 7 includes the apparatus of embodiment 1, wherein a first set of one or more power control factors are decoded for a first waveform used for a first one of the plurality of uplink transmission beams, and a second set of one or more power control factor are decoded for a second waveform used for a second one of the plurality of uplink transmission beams.

Embodiment 8 includes the apparatus of embodiment 1, wherein the higher level signaling includes one or more of a System Information Block (SIB), a Master Information Block (MIB), a Radio Resource Control (RRC), or a Media Access Control (MAC) Control Element (CE).

Embodiment 9 includes the apparatus of embodiments 1, 2, 4, 7 or 8, wherein the transmission power of the one or more of the plurality of uplink transmission beams are each determined independently based on one or more of a target receive power, a path loss compensation factor ($\alpha$), a power offsets and an accumulation flag, for one or more uplink data channels and uplink control channels.

Embodiment 10 includes an apparatus of a user equipment (UE) operable to configure uplink transmission power in a multi-beam system, the UE comprising: one or more processors configured to, decode, at the UE, higher level signaling received from a Base Station (BS) including one or more power control factors common for a plurality of uplink transmission beams; decode, at the UE, higher level signaling received from the base station including one or more offset power control factors for corresponding ones of a plurality of uplink transmission beams; estimate, at the UE, a path loss for corresponding ones of the plurality of uplink transmission beams; and determine, at the UE, a transmission power of one or more of the plurality of uplink transmission beams as a function of the decoded common power control factor, the offset power control factors for corresponding ones of a plurality of uplink transmission beams, and the estimated path loss of the corresponding ones of the plurality of uplink transmission beams; and a memory interface configured to send to a memory one or more indicators of the determined transmission power of the corresponding ones of the plurality of uplink transmission beams.

Embodiment 11 includes the apparatus of embodiment 10, wherein the one or more processors are further configured to transmit on one or more of the plurality of uplink transmission beams based on the determined transmission power of the corresponding ones of the plurality of uplink transmission beams.

Embodiment 12 includes the apparatus of embodiment 10, wherein the common power control factors include a common resource block power ($P_0$) for the plurality of uplink transmission beams.

Embodiment 13 includes the apparatus of embodiment 12, wherein the one or more offset power control factors for corresponding ones of the plurality of uplink transmission beams are a function of a difference in resource block power ($P_0$) for corresponding ones of the plurality of uplink transmission beams.

Embodiment 14 includes the apparatus of embodiment 12, wherein the resource block power ($P_0$) is a function of one or more of an interference, a thermal noise and a target signal interference noise ratio for the plurality of uplink transmission beams.

Embodiment 15 includes the apparatus of embodiment 12, wherein the common power control factor includes a path loss compensation factor ($\alpha$) for the plurality of uplink transmission beams.

Embodiment 16 includes the apparatus of embodiment 10, wherein a first set of one or more power control factors are decoded for a first waveform used for a first one of the plurality of uplink transmission beams, and a second set of one or more power control factor are decoded for a second waveform used for a second one of the plurality of uplink transmission beams.

Embodiment 17 includes the apparatus of embodiment 10, wherein the higher level signaling includes one or more of a System Information Block (SIB), a Master Information Block (MIB), a Radio Resource Control (RRC), or a Media Access Control (MAC) Control Element (CE).

Embodiment 18 includes the apparatus of embodiments 10, 11, 12, 16 or 17, wherein the transmission power of the one or more of the plurality of uplink transmission beams are each determined independently based on one or more of a target receive power, a path loss compensation factor ($\alpha$), a power offsets and an accumulation flag, for one or more uplink data channels and uplink control channels.

Embodiment 19 includes an apparatus of a user equipment (UE) operable to configure uplink transmission power in a multi-beam system, the UE comprising: one or more processors configured to, decode, at the UE, higher level signaling received from a Base Station (BS) including one or more power control factors of a plurality of Beam Management Signals (BMS); estimate, at the UE, a path loss for corresponding ones of the plurality of Beam Management Signals (BMS); determine, at the UE, a $k^{th}$ least path loss ($PL_{k^{th}}$) for the plurality of Uplink Beam Management Signals (UL BMS); and determine, at the UE, a transmission power of corresponding ones of the plurality of Uplink Beam Management Signals (UL BMS) as a function of the one or more decoded power control factors and the determined $k^{th}$ least path loss ($PL_{k^{th}}$) of the Downlink Beam Measurement Reference Signal (DL BM RS); and a memory interface configured to send to a memory one or more indicators of the determined transmission power of the corresponding ones of the plurality of Uplink Beam Management Signals (UL BMS).

Embodiment 20 includes the apparatus of embodiment 19, wherein one or more power control factors can be configured independently for different Beam Management Signals (BMS).

Embodiment 21 includes the apparatus of embodiment 19, wherein the resource block power ($P_0$) is a function of one or more of an interference, a thermal noise and a target signal interference noise ratio for each of the plurality of Uplink Beam Management Signals (UL BMS).

Embodiment 22 includes the apparatus of embodiment 19, wherein the transmission power is further determined as a function of a power control offset ($\hat{\Delta}$).

Embodiment 23 includes the apparatus of embodiment 19, wherein the transmission power is further determined as a function of a first power control offset ($\hat{\Delta}_r$) configured by higher level signaling and a second power control offset ($\hat{\Delta}_d$) configured by Downlink Control Information (DCI).

Embodiment 24 includes the apparatus of embodiments 19-22 or 23, wherein the one or more processors are further configured to transmit on one or more of the of the plurality of Uplink Beam Management Signals (UL BMS) based on the determined transmission power of the corresponding ones of the plurality of Uplink Beam Management Signals (UL BMS).

Embodiment 25 includes the apparatus of embodiment 19, wherein the plurality of Uplink Beam Management Signals (UL BMS) includes a Physical Random Access Channel (PRACH), a Sounding Reference Signal (SRS), or Physical Uplink Control Channel (PUCCH).

Embodiment 26 includes an apparatus of a user equipment (UE) operable to configure uplink transmission power in a multi-beam system, the UE comprising: one or more processors configured to, decode, at the UE, higher level signaling received from a Base Station (BS) including one or more power control factors of a plurality of Beam Management Signals (BMS); estimate, at the UE, a path loss for a set of the plurality of Beam Management Signals (BMS); determine, at the UE, a mean, median, mode or filtered path loss for the set of the plurality of Uplink Beam Management Signals (UL BMS); and determine, at the UE, a transmission power of corresponding ones of the plurality of Uplink Beam Management Signals (UL BMS) as a function of the one or more decoded power control factors and the determined mean, median, mode or filtered path loss of the Downlink Beam Measurement Reference Signal (DL BM RS); and a memory interface configured to send to a memory one or more indicators of the determined transmission power of the corresponding ones of the plurality of Uplink Beam Management Signals (UL BMS).

Embodiment 27 includes the apparatus of embodiment 26, wherein one or more power control factors can be configured independently for different Beam Management Signals (BMS).

Embodiment 28 includes the apparatus of embodiment 26, wherein the resource block power ($P_0$) is a function of one or more of an interference, a thermal noise and a target signal interference noise ratio for each of the plurality of Uplink Beam Management Signals (UL BMS).

Embodiment 29 includes the apparatus of embodiment 26, wherein the transmission power is further determined as a function of a power control offset ($\hat{\Delta}$).

Embodiment 30 includes the apparatus of embodiment 26, wherein the transmission power is further determined as a function of a first power control offset ($\hat{\Delta}_r$) configured by higher level signaling and a second power control offset ($\hat{\Delta}_d$) configured by Downlink Control Information (DCI).

Embodiment 31 includes the apparatus of embodiments 26-29 or 30, wherein the one or more processors are further configured to transmit on one or more of the of the plurality of Uplink Beam Management Signals (UL BMS) based on the determined transmission power of the corresponding ones of the plurality of Uplink Beam Management Signals (UL BMS).

Embodiment 32 includes the apparatus of embodiment 26, wherein the plurality of Uplink Beam Management Signals (UL BMS) includes a Physical Random Access Channel (PRACH), a Sounding Reference Signal (SRS), or Physical Uplink Control Channel (PUCCH).

Embodiment 33 includes an apparatus of a user equipment (UE) operable to configure uplink transmission power in a multi-beam system comprising: a means for decoding higher level signaling received from a Base Station (BS) including one or more power control factors for corresponding ones of a plurality of uplink transmission beams; a means for estimating a path loss for corresponding ones of the plurality of uplink transmission beams; and a means for determine a transmission power of one or more of the plurality of uplink transmission beams as a function of the one or more decoded power control factors and the estimated path loss of the corresponding ones of the plurality of uplink transmission beams.

Embodiment 34 includes the apparatus of embodiment 33, further comprising a means for encoding an uplink signal for transmission on one or more of the plurality of uplink transmission beams based on the determined transmission power of the corresponding ones of the plurality of uplink transmission beams.

Embodiment 35 includes the apparatus of embodiments 33 or 34, wherein the determined transmission power can be used for an Open Loop Power Control (OLPC) portion of a Transmit Power Control (TPC).

Embodiment 36 includes the apparatus of embodiment 33, wherein the one or more power control factors includes a resource block power ($P_0$) for each of the plurality of uplink transmission beams.

Embodiment 37 includes the apparatus of embodiment 36, wherein the resource block power ($P_0$) is a function of one or more of an interference, a thermal noise and a target signal interference noise ratio for each of the plurality of uplink transmission beams.

Embodiment 38 includes the apparatus of embodiment 36, wherein the one or more power control factors includes a path loss compensation factor ($\alpha$) for each of a plurality of uplink transmission beams.

Embodiment 39 includes the apparatus of embodiment 33, wherein a first set of one or more power control factors are decoded for a first waveform used for a first one of the plurality of uplink transmission beams, and a second set of one or more power control factor are decoded for a second waveform used for a second one of the plurality of uplink transmission beams.

Embodiment 40 includes the apparatus of embodiment 33, wherein the higher level signaling includes one or more of a System Information Block (SIB), a Master Information Block (MIB), a Radio Resource Control (RRC), or a Media Access Control (MAC) Control Element (CE).

Embodiment 41 includes the apparatus of embodiments 33, 34, 36, 39 or 40, wherein the transmission power of the one or more of the plurality of uplink transmission beams are each determined independently based on one or more of a target receive power, a path loss compensation factor ($\alpha$), a power offsets and an accumulation flag, for one or more uplink data channels and uplink control channels.

Embodiment 42 includes an apparatus of a user equipment (UE) operable to configure uplink transmission power in a multi-beam system comprising: a means for decoding, at the UE, higher level signaling received from a Base Station (BS) including one or more power control factors common for a plurality of uplink transmission beams; a means for decoding, at the UE, higher level signaling received from the base station including one or more offset power control factors for corresponding ones of a plurality of uplink transmission beams; a means for estimating, at the UE, a path loss for corresponding ones of the plurality of uplink transmission beams; and a means for determining, at the UE, a transmission power of one or more of the plurality of uplink transmission beams as a function of the decoded common power control factor, the offset power control factors for corresponding ones of a plurality of uplink transmission beams, and the estimated path loss of the corresponding ones of the plurality of uplink transmission beams.

Embodiment 43 includes the apparatus of embodiment 42, further comprising a means for transmitting on one or more of the plurality of uplink transmission beams based on the determined transmission power of the corresponding ones of the plurality of uplink transmission beams.

Embodiment 44 includes the apparatus of embodiment 42, wherein the common power control factors include a common resource block power ($P_O$) for the plurality of uplink transmission beams.

Embodiment 45 includes the apparatus of embodiment 44, wherein the one or more offset power control factors for corresponding ones of the plurality of uplink transmission beams are a function of a difference in resource block power ($P_O$) for corresponding ones of the plurality of uplink transmission beams.

Embodiment 46 includes the apparatus of embodiment 44, wherein the resource block power ($P_O$) is a function of one or more of an interference, a thermal noise and a target signal interference noise ratio for the plurality of uplink transmission beams.

Embodiment 47 includes the apparatus of embodiment 44, wherein the common power control factor includes a path loss compensation factor ($\alpha$) for the plurality of uplink transmission beams.

Embodiment 48 includes the apparatus of embodiment 42, wherein a first set of one or more power control factors are decoded for a first waveform used for a first one of the plurality of uplink transmission beams, and a second set of one or more power control factor are decoded for a second waveform used for a second one of the plurality of uplink transmission beams.

Embodiment 49 includes the apparatus of embodiment 42, wherein the higher level signaling includes one or more of a System Information Block (SIB), a Master Information Block (MIB), a Radio Resource Control (RRC), or a Media Access Control (MAC) Control Element (CE).

Embodiment 50 includes the apparatus of embodiments 42, 43, 44, 48 or 49, wherein the transmission power of the one or more of the plurality of uplink transmission beams are each determined independently based on one or more of a target receive power, a path loss compensation factor ($\alpha$), a power offsets and an accumulation flag, for one or more uplink data channels and uplink control channels.

Embodiment 51 includes at least one machine readable storage medium having instructions embodied thereon that when executed perform a process of configuring uplink transmission power in a multi-beam system at a User Equipment (UE) comprising: decoding higher level signaling received from a Base Station (BS) including one or more power control factors of a plurality of Beam Management Signals (BMS); estimating a path loss for corresponding ones of the plurality of Beam Management Signals (BMS); determining a $k^{th}$ least path loss ($PL_{k^{th}}$) for the plurality of Uplink Beam Management Signals (UL BMS); and determining a transmission power of corresponding ones of the plurality of Uplink Beam Management Signals (UL BMS) as a function of the one or more decoded power control factors and the determined $k^{th}$ least path loss ($PL_{k^{th}}$) of the Downlink Beam Measurement Reference Signal (DL BM RS).

Embodiment 52 includes at least one machine readable storage medium of embodiment 51, wherein one or more power control factors can be configured independently for different Beam Management Signals (BMS).

Embodiment 53 includes at least one machine readable storage medium of embodiment 51, wherein the resource block power ($P_O$) is a function of one or more of an interference, a thermal noise and a target signal interference noise ratio for each of the plurality of Uplink Beam Management Signals (UL BMS).

Embodiment 54 includes at least one machine readable storage medium of embodiment 51, wherein the transmission power is further determined as a function of a power control offset ($\hat{\Delta}$).

Embodiment 55 includes at least one machine readable storage medium of embodiment 51, wherein the transmission power is further determined as a function of a first power control offset ($\hat{\Delta}_r$) configured by higher level signaling and a second power control offset ($\hat{\Delta}_d$) configured by Downlink Control Information (DCI).

Embodiment 56 includes at least one machine readable storage medium of embodiments 51-54 or 55, wherein the one or more processors are further configured to transmit on one or more of the of the plurality of Uplink Beam Management Signals (UL BMS) based on the determined transmission power of the corresponding ones of the plurality of Uplink Beam Management Signals (UL BMS).

Embodiment 57 includes at least one machine readable storage medium of embodiment 51, wherein the plurality of Uplink Beam Management Signals (UL BMS) includes a Physical Random Access Channel (PRACH), a Sounding Reference Signal (SRS), or Physical Uplink Control Channel (PUCCH).

Embodiment 58 includes at least one machine readable storage medium having instructions embodied thereon that when executed perform a process of configuring uplink transmission power in a multi-beam system at a User Equipment (UE) comprising: decoding higher level signaling received from a Base Station (BS) including one or more power control factors of a plurality of Beam Management Signals (BMS); estimating a path loss for a set of the plurality of Beam Management Signals (BMS); determining a mean, median, mode or filtered path loss for the set of the plurality of Uplink Beam Management Signals (UL BMS); and determining a transmission power of corresponding ones of the plurality of Uplink Beam Management Signals (UL BMS) as a function of the one or more decoded power control factors and the determined mean, median, mode or filtered path loss of the Downlink Beam Measurement Reference Signal (DL BM RS).

Embodiment 59 includes at least one machine readable storage medium of embodiment 58, wherein one or more power control factors can be configured independently for different Beam Management Signals (BMS).

Embodiment 60 includes at least one machine readable storage medium of embodiment 58, wherein the resource block power ($P_O$) is a function of one or more of an interference, a thermal noise and a target signal interference noise ratio for each of the plurality of Uplink Beam Management Signals (UL BMS).

Embodiment 61 includes at least one machine readable storage medium of embodiment 58, wherein the transmission power is further determined as a function of a power control offset ($\hat{\Delta}$).

Embodiment 62 includes at least one machine readable storage medium of embodiment 58, wherein the transmission power is further determined as a function of a first power control offset ($\hat{\Delta}_r$) configured by higher level signaling and a second power control offset ($\hat{\Delta}_d$) configured by Downlink Control Information (DCI).

Embodiment 63 includes at least one machine readable storage medium of embodiments 58-61 or 62, wherein the one or more processors are further configured to transmit on one or more of the of the plurality of Uplink Beam Management Signals (UL BMS) based on the determined transmission power of the corresponding ones of the plurality of Uplink Beam Management Signals (UL BMS).

Embodiment 649 includes at least one machine readable storage medium of embodiment 58, wherein the plurality of Uplink Beam Management Signals (UL BMS) includes a Physical Random Access Channel (PRACH), a Sounding Reference Signal (SRS), or Physical Uplink Control Channel (PUCCH).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to configure uplink transmission power in a multi-beam system, the UE comprising:
    one or more processors configured to:
        decode, at the UE, higher level signaling received from a base station including one or more power control factors for corresponding ones of a plurality of uplink transmission beams, at least one of the one or more power control factors comprising a resource block power ($P_O$) for each of the plurality of uplink transmission beams, the resource block power ($P_O$) being associated with a resource block comprising a physical channel mapped to a smallest time-frequency unit within a resource grid, the resource block power ($P_O$) comprising a function of one or more of an interference, a thermal noise and a target signal interference noise ratio for each of the plurality of uplink transmission beams;
        estimate, at the UE, a path loss for corresponding ones of the plurality of uplink transmission beams; and
        determine, at the UE, a transmission power of one or more of the plurality of uplink transmission beams as a function of the one or more decoded power control factors and the estimated path loss of the corresponding ones of the plurality of uplink transmission beams; and
    a memory interface configured to send to a memory one or more indicators of the determined transmission power of the corresponding ones of the plurality of uplink transmission beams.

2. The apparatus of claim 1, further comprising a transceiver configured to: receive, at the UE, higher level signaling received from the base station, including one or more power control factors for corresponding ones of a plurality of uplink transmission beams.

3. The apparatus of claim 1, wherein the one or more processors are further configured to:
    encode an uplink signal for transmission on one or more of the plurality of uplink transmission beams based on the determined transmission power of the corresponding ones of the plurality of uplink transmission beams.

4. The apparatus of claim 1, wherein the one or more power control factors includes a path loss compensation factor (a) for each of a plurality of uplink transmission beams.

5. The apparatus of claim 1, wherein the higher level signaling includes one or more of a System Information Block (SIB), a Master Information Block (MIB), a Radio Resource Control (RRC), or a Media Access Control (MAC) Control Element (CE).

6. The apparatus of claim 1, wherein the UE includes an antenna, a touch sensitive display screen, a speaker, a microphone, a graphics processor, an application processor, an internal memory, a non-volatile memory port, or combinations thereof.

7. At least one non-transitory machine readable storage medium having instructions embodied thereon for a user equipment (UE) configured for uplink transmission power in a multi-beam system, the instructions when executed by one or more processors at the UE perform the following:
    decoding, at the UE, higher level signaling received from a base station including one or more power control factors for corresponding ones of a plurality of uplink transmission beams, at least one of the one or more power control factors comprising a resource block power ($P_O$) for each of the plurality of uplink transmission beams, the resource block power ($P_O$) being associated with a resource block comprising a physical channel mapped to a smallest time-frequency unit within a resource grid, the resource block power ($P_O$) comprising a function of one or more of an interference, a thermal noise and a target signal interference noise ratio for each of the plurality of uplink transmission beams;
    estimating, at the UE, a path loss for corresponding ones of the plurality of uplink transmission beams; and
    determining, at the UE, a transmission power of one or more of the plurality of uplink transmission beams as a function of the one or more decoded power control factors and the estimated path loss of the corresponding ones of the plurality of uplink transmission beams.

8. The at least one machine readable storage medium in claim 7 further comprising instructions, that when executed by one or more processors at the UE, perform the following:
    receiving, at the UE, higher level signaling received from the base station, including one or more power control factors for corresponding ones of a plurality of uplink transmission beams.

9. The at least one machine readable storage medium in claim 7 further comprising instructions, that when executed by one or more processors at the UE, perform the following:
    encoding an uplink signal for transmission on one or more of the plurality of uplink transmission beams based on the determined transmission power of the corresponding ones of the plurality of uplink transmission beams.

10. The at least one machine readable storage medium in claim 7, wherein the one or more power control factors includes a path loss compensation factor (a) for each of a plurality of uplink transmission beams.

11. The at least one machine readable storage medium in claim 7, wherein the higher level signaling includes one or more of a System Information Block (SIB), a Master Information Block (MIB), a Radio Resource Control (RRC), or a Media Access Control (MAC) Control Element (CE).

* * * * *